(12) United States Patent
Gerçek

(10) Patent No.: US 12,062,996 B2
(45) Date of Patent: Aug. 13, 2024

(54) SYNCHRONIZING GRID SIDE HARMONIC FILTER AND PRE-CHARGING CELL CAPACITORS IN MODULAR MULTILEVEL CONVERTERS

(71) Applicant: VESTAS WIND SYSTEMS A/S, Aarhus N (DK)

(72) Inventor: Cem Özgür Gerçek, Regensburg (DE)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 270 days.

(21) Appl. No.: 17/762,315

(22) PCT Filed: Sep. 17, 2020

(86) PCT No.: PCT/DK2020/050257
§ 371 (c)(1),
(2) Date: Mar. 21, 2022

(87) PCT Pub. No.: WO2021/052547
PCT Pub. Date: Mar. 25, 2021

(65) Prior Publication Data
US 2022/0337147 A1   Oct. 20, 2022

(30) Foreign Application Priority Data
Sep. 19, 2019   (DK) .............................. 2019 70575

(51) Int. Cl.
*H02M 7/537*   (2006.01)
*H02J 3/38*   (2006.01)
(Continued)

(52) U.S. Cl.
CPC ............ *H02M 7/487* (2013.01); *H02J 3/381* (2013.01); *H02M 1/126* (2013.01); *H02M 1/36* (2013.01);
(Continued)

(58) Field of Classification Search
CPC .................... H02M 7/537–53873; H02M 1/36
See application file for complete search history.

(56) References Cited

U.S. PATENT DOCUMENTS 10,673,353 B2 *   6/2020   Drofenik ................... H02J 7/35
10,886,858 B1 *   1/2021   Zhang ................... H02M 7/537
(Continued)

FOREIGN PATENT DOCUMENTS

| WO | 2018091051 A1 | 5/2018 | |
| WO | 2021052547 A1 | 3/2021 | |
| WO | WO-2021052547 A1 * | 3/2021 | .............. H02J 3/381 |

OTHER PUBLICATIONS

Danish Patent and Trademark Office, 1st Technical Examination including The Search Report and Search Opinion for Application PA 2019 70575 dated Apr. 15, 2020.
(Continued)

*Primary Examiner* — Sisay G Tiku
(74) *Attorney, Agent, or Firm* — Patterson + Sheridan, LLP

(57) ABSTRACT

Synchronizing a grid side harmonic filter and pre-charging cell capacitors in modular multilevel converters by: opening a transmission circuit breaker disposed on a first path between a power grid and a converter system; closing a pre-charging contactor disposed on a second path between the power grid and the converter system that includes a set of pre-charge resistors; connecting the power grid to the converter system and the harmonic filter over the second path; selectively charging cell capacitors in the converter system until a charge threshold is reached, wherein a smaller subset of the cell capacitors is charged at a given time than in an earlier time, and each cell capacitor is charged to a higher cell voltage than in the earlier time; and closing the transmission circuit breaker and connecting a generator to
(Continued)

the converter system via a generator circuit breaker while leaving the pre-charging contactor closed.

14 Claims, 14 Drawing Sheets

(51) Int. Cl.
    *H02M 1/12*     (2006.01)
    *H02M 1/36*     (2007.01)
    *H02M 7/483*     (2007.01)
    *H02M 7/487*     (2007.01)
    *H02M 7/538*     (2007.01)
    *H02M 1/00*     (2006.01)

(52) U.S. Cl.
    CPC ....... *H02M 7/4835* (2021.05); *H02J 2300/28* (2020.01); *H02M 1/0095* (2021.05)

(56) References Cited

U.S. PATENT DOCUMENTS

| | | |
|---|---|---|
| 2011/0013441 A1 | 1/2011 | Gruber et al. |
| 2013/0313826 A1 | 11/2013 | Gupta et al. |
| 2016/0211762 A1* | 7/2016 | Cheng ..................... H02M 1/36 |
| 2017/0271997 A1* | 9/2017 | Herold ..................... B60M 3/00 |
| 2017/0294847 A1 | 10/2017 | Xie et al. |
| 2018/0115164 A1 | 4/2018 | Gupta et al. |
| 2019/0288509 A1* | 9/2019 | Buchmann ............... H02M 1/32 |
| 2022/0278604 A1* | 9/2022 | Parkhou ................ H02J 7/0019 |
| 2022/0311241 A1* | 9/2022 | Chen ................... H02M 5/4585 |

OTHER PUBLICATIONS

PCT, International Search Report for Application PCT/DK2020/050257 dated Sep. 11, 2020.

PCT, Written Opinion of The International Searching Authority for Application PCT/DK2020/050257 dated Sep. 11, 2020.

* cited by examiner

SYNCHRONIZING GRID SIDE HARMONIC FILTER AND PRE-CHARGING CELL CAPACITORS IN MODULAR MULTILEVEL CONVERTERS

BACKGROUND

Field of the Invention

Embodiments presented in this disclosure generally relate to Modular Multilevel Converters (MMCs) and the capacitors included therein. Particular embodiments herein describe synchronizing and pre-charging schema for the filters and capacitors.

Description of the Related Art

Wind Turbine Generators (WTGs) are an increasing popular source for generating electricity and may be deployed singly or in groups of several wind turbines, often referred to as a wind farm. In WTGs and other power generating or consuming systems connected to a power grid or distribution line, MMCs can be used to electrically link two powered systems running different voltage/current schemas. When initiating a link between two powered systems, the MMC equalizes the differences in voltages/currents between the two systems to reduce power surges (e.g., inrush current from the higher voltage side to the lower voltage side) and other aberrant effects. For example, in a WTG, an MMC can equalize the difference via a DC (Direct Current) link located between the machine side converter (MSC) and line side converter (LSC) that is charged to a predefined level before contact is made via a series of charging components (e.g., one or more transformers, diode bridges, current limiter resistors, fuses, circuit breakers, switches, etc.)

SUMMARY

One embodiment of the present disclosure is a method comprising; initializing contactors to connect a power grid to a harmonic filter and a modular multilevel converter, wherein the MMC is disposed between the power grid and a generator and the harmonic filter is disposed between the power grid and the MMC, wherein initializing the contactors comprises: opening a transmission circuit breaker disposed on a first path, wherein the transmission circuit breaker is disposed between the power grid and the MMC, and closing a pre-charging contactor disposed on a second path, wherein the pre-charging contactor is disposed between the power grid and the MMC, wherein the second path is parallel to the first path and includes a set of pre-charge resistors; connecting the power grid to the MMC and the harmonic filter over the second path; pre-charging cell capacitors in the MMC in an un-driven stage; in response to a cell voltage of the cell capacitors satisfying a driving threshold, pre-charging the cell capacitors in a driven stage; and in response to the cell voltage satisfying a charge threshold, completing pre-charging by connecting the generator to the MMC via a generator circuit breaker while the transmission circuit breaker and the pre-charging contactor are closed, the driving threshold is based on a peak phase-to-phase voltage of a grid voltage divided by a number of cell capacitors disposed on a given phase of the MMC.

In one embodiment, in combination with any method described above or below, the driving threshold is based on a peak phase-to-phase voltage of a grid voltage divided by a number of cell capacitors disposed on a given phase of the MMC.

In one embodiment, in combination with any method described above or below, the driven stage employs a progressive driving schema to iteratively increase a number of cell capacitors bypassed at a given time by one relative to a preceding time to boost a charge level in non-bypassed cell capacitors.

In one embodiment, in combination with any method described above or below, the driven stage employs a halving driving schema to exponentially increase a number of cell capacitors bypassed at a given time relative to a preceding time to boost a charge level in non-bypassed cell capacitors.

In one embodiment, in combination with any method described above or below, the method further comprises: after connecting the generator, opening the pre-charging contactor.

In one embodiment, in combination with any method described above or below, a resistance of the pre-charge resistors is selected based on an impedance of the harmonic filter at a grid frequency of the power grid.

In one embodiment, in combination with any method described above or below, the driven stage places a given dual-cell in the MMC into operational modes including: a natural blocking mode, for charging a first cell capacitor and a second cell capacitor in the given dual-cell; a first forced bypass mode, for charging the first cell capacitor and bypassing the second cell capacitor; a second forced bypass mode, for charging the second cell capacitor and bypassing the first cell capacitor; and a third forced bypass mode, for bypassing the first cell capacitor and the second cell capacitor.

One embodiment of the present disclosure is a Power Conversion and Transmission System, comprising: a grid circuit breaker, disposed to selectively connect a power grid with the Power Conversion and Transmission System; a Modular Multilevel Converter, including a plurality of cells each including cell switches and a cell capacitor; a generator circuit breaker, disposed to selectively connect a generator with a machine side converter of the MMC; a harmonic filter, connected to a transmission line connected to a line side converter of the MMC, wherein the transmission line defines a first path when a transmission circuit breaker is closed and a second path when a pre-charging contactor is closed, wherein the first path connects the grid circuit breaker with the harmonic filter and the line side converter, wherein the second path connects the grid circuit breaker with the harmonic filter and the line side converter over a pre-charge resistor, and wherein the first path is parallel to the second path and bypasses the pre-charge resistors; and a controller configured to pre-charge the cell capacitors and synchronize the harmonic filter with the power grid by: in response to a cell voltage in the cell capacitors satisfying a driving threshold, driving the cell switches into forced bypass modes to boost the cell voltage to a charge threshold; and in response to the cell voltage in the cell capacitors satisfying the charge threshold, while the pre-charging contactor is closed: closing the transmission circuit breaker, and closing the generator circuit breaker, and the driving threshold is based on a peak phase-to-phase voltage of a grid voltage divided by a number of cell capacitors disposed on a given phase of the MMC.

In one embodiment, in combination with any system described above or below, each cell of the plurality of cells is a dual cell that includes two cell capacitors and four cell switches.

In one embodiment, in combination with any system described above or below, the controller is further configured to open the pre-charging contactor after closing the generator circuit breaker.

In one embodiment, in combination with any system described above or below, the forced bypass modes bypass at least one cell capacitor included in the cells to apply a rectified voltage from the power grid across a subset of the cell capacitors.

In one embodiment, in combination with any system described above or below, the controller is further configured to cease boosting the cell voltage in response to the cell voltage in the cell capacitors satisfying the charge and place the cells in an operational mode in anticipation of inverting and rectifying power supplied from the generator for provision to the power grid.

In one embodiment, in combination with any system described above or below, a resistance of the pre-charge resistor is configured to be at less than 10% of an impedance of the harmonic filter at a grid frequency of the power grid.

In one embodiment, in combination with any system described above or below, the system is further configured for three-phase power transmission.

One embodiment of the present disclosure is controller unit a for a Power Conversion and Transmission System, comprising: a processor; and a memory, including pre-charging control logic that when executed by the processor, enable the controller unit to perform an operation comprising: initializing circuit breakers to connect a power grid to a harmonic filter and to a converter system, wherein initializing the circuit breakers includes: opening a transmission circuit breaker disposed on a first path, wherein the transmission circuit breaker is disposed between the power grid and the converter system; and closing a pre-charging contactor disposed on a second path, wherein the pre-charging contactor is disposed between the power grid and the converter system, wherein the second path includes a set of pre-charge resistors, wherein the second path is parallel to the first path which bypasses the set of pre-charge resistors; connecting the power grid to the converter system and the harmonic filter over the second path; selectively charging cell capacitors in the converter system over a series of iterations until a charge threshold is reached, wherein each iteration of the series of iterations charges a smaller subset of the cell capacitors at a given time than in an earlier iteration of the series of iterations, and each cell capacitor is charged to a higher cell voltage than in the earlier iteration; and closing the transmission circuit breaker and connecting a generator to the converter system via a generator circuit breaker while leaving the pre-charging contactor closed.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DESCRIPTION OF EXAMPLE EMBODIMENTS

Systems and methods for a novel control schema for pre-charging an MMC (Modular Multilevel Converter) at the same time as synchronizing a harmonic filter to grid voltage is provided herein that allows for preventing inrush currents from the grid into the harmonic filter, thus protecting against over currents and increasing the lifetime of the filter components together with other related system equipment. In an un-driven stage, the capacitors in the MMC and the harmonic filter are pre-charged from the grid over the pre-charge resistors to threshold levels before connecting the grid directly to the MMC. The un-driven stage may last until the sum of cell voltages in an arm becomes equal to the rectified (peak) voltage of grid line-to-line voltage for a Line Side Converter in the MMC. After the un-driven stage, the MMC enters a driven or controlled stage, during which the charge of the cell capacitors is boosted to the rated operation voltage by progressively reducing the number of cell capacitors to which the grid applies a voltage in series to at a time. The MMC swaps or interchanges which capacitors are subject to the charging currents in the driven stage until all of the capacitors have reached a threshold voltage, at which point normal operations of the MMC may begin.

EXAMPLE EMBODIMENTS

Figure 1:
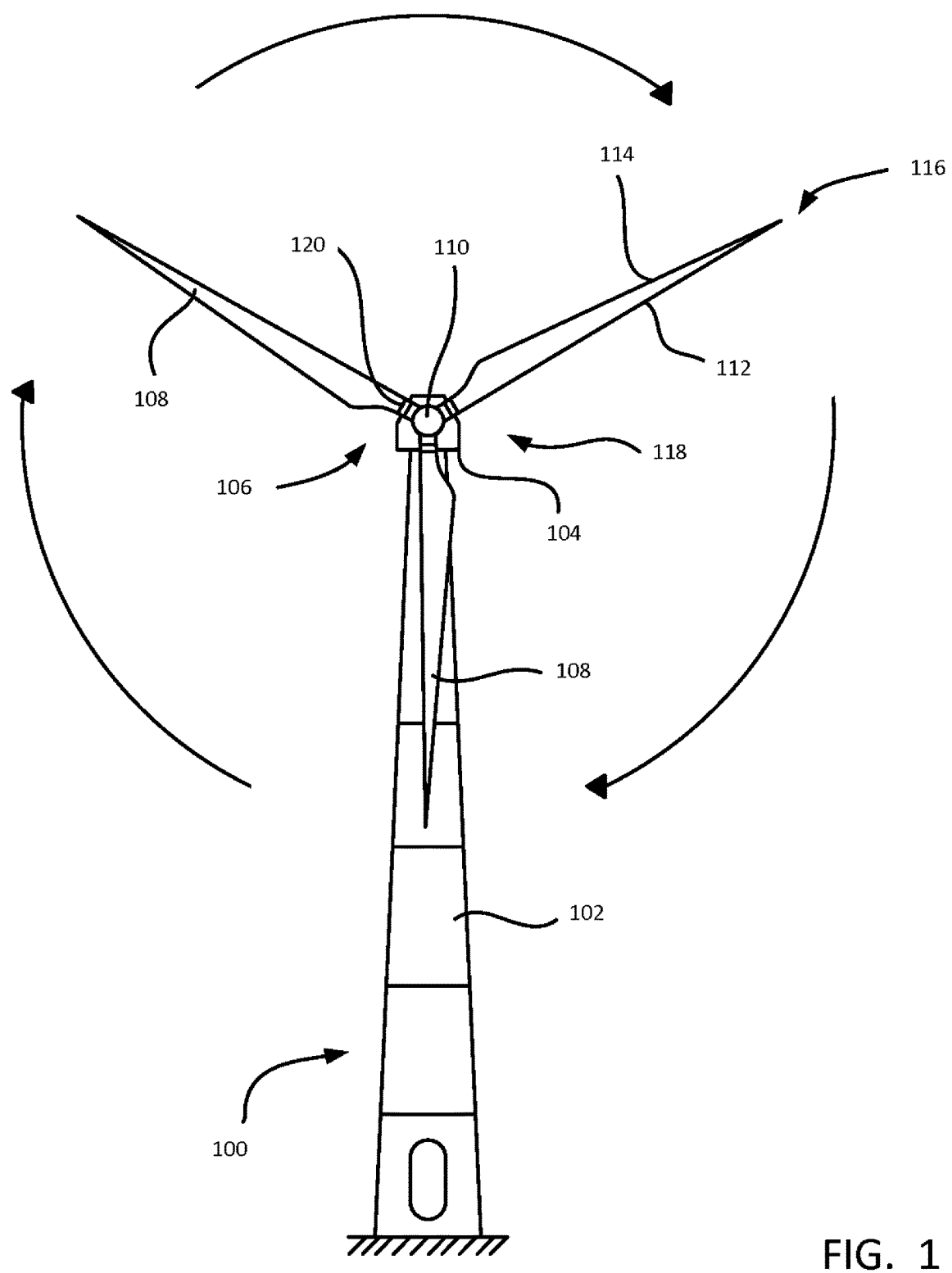
FIG. 1 illustrates a diagrammatic view of a wind turbine, according to an embodiment described in this present disclosure.

FIG. 1 illustrates a diagrammatic view of a horizontal-axis wind turbine generator (WTG) 100. The WTG 100 typically comprises a tower 102 and a wind turbine nacelle 104 located at the top of the tower 102. A wind turbine rotor 106 may be connected with the nacelle 104 through a low speed shaft extending out of the nacelle 104. The wind turbine rotor 106 comprises three rotor blades 108 mounted on a common hub 110 which rotate in a rotor plane, but may comprise any suitable number of blades, such as one, two, four, five, or more blades. The blades 108 (or airfoil) typically each have an aerodynamic shape with a leading edge 112 for facing into the wind, a trailing edge 114 at the opposite end of a chord for the blades 108, a tip 116, and a root 118 for attaching to the hub 110 in any suitable manner.

For some embodiments, the blades 108 may be connected to the hub 110 using pitch bearings 120 such that each blade 108 may be rotated around its longitudinal axis to adjust the blade's pitch. The pitch angle of a blade 108 relative to the rotor plane may be controlled by linear actuators, hydraulic actuators, or stepper motors, for example, connected between the hub 110 and the blades 108.

Figure 2:
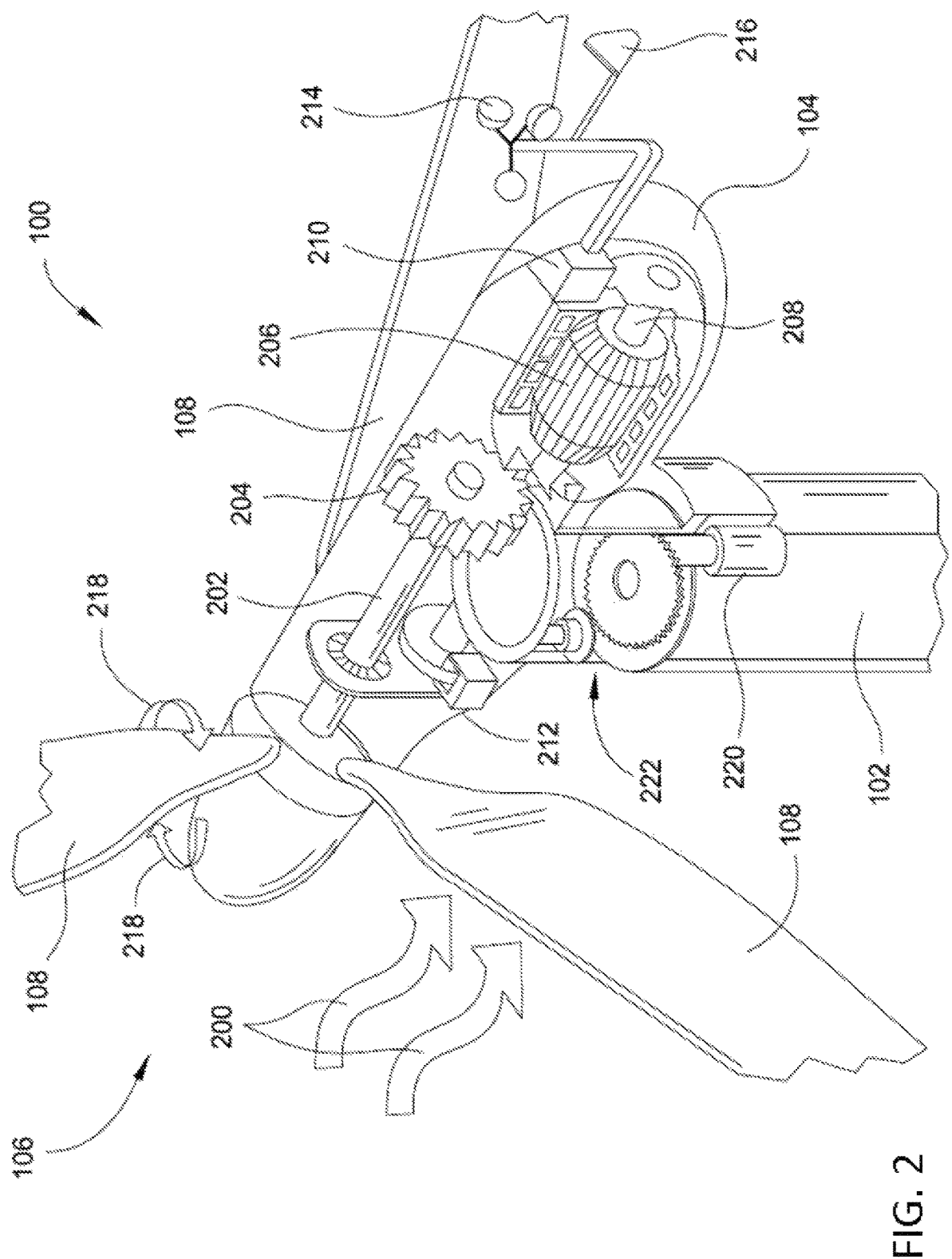
FIG. 2 illustrates a diagrammatic view of the components internal to the nacelle and tower of a wind turbine, according to an embodiment described in this present disclosure.

FIG. 2 illustrates a diagrammatic view of typical components internal to the nacelle 104 and tower 102 of a WTG 100. When the wind 200 pushes on the blades 108, the rotor 106 spins and rotates a low-speed shaft 202. Gears in a gearbox 204 mechanically convert the low rotational speed of the low-speed shaft 202 into a relatively high rotational speed of a high-speed shaft 208 suitable for generating electricity using a generator 206.

A controller 210 may sense the rotational speed of one or both of the shafts 202, 208. If the controller decides that the shaft(s) are rotating too fast, the controller may signal a braking system 212 to slow the rotation of the shafts, which slows the rotation of the rotor 106—i.e., reduces the revolutions per minute (RPM). The braking system 212 may prevent damage to the components of the WTG 100. The controller 210 may also receive inputs from an anemometer 214 (providing wind speed) and/or a wind vane 216 (providing wind direction). Based on information received, the controller 210 may send a control signal to one or more of the blades 108 in an effort to adjust the pitch 218 of the blades. By adjusting the pitch 218 of the blades with respect to the wind direction, the rotational speed of the rotor (and therefore, the shafts 202, 208) may be increased or decreased. Based on the wind direction, for example, the controller 210 may send a control signal to an assembly comprising a yaw motor 220 and a yaw drive 222 to rotate the nacelle 104 with respect to the tower 102, such that the rotor 106 may be positioned to face more (or, in certain circumstances, less) upwind.

Figure 3:
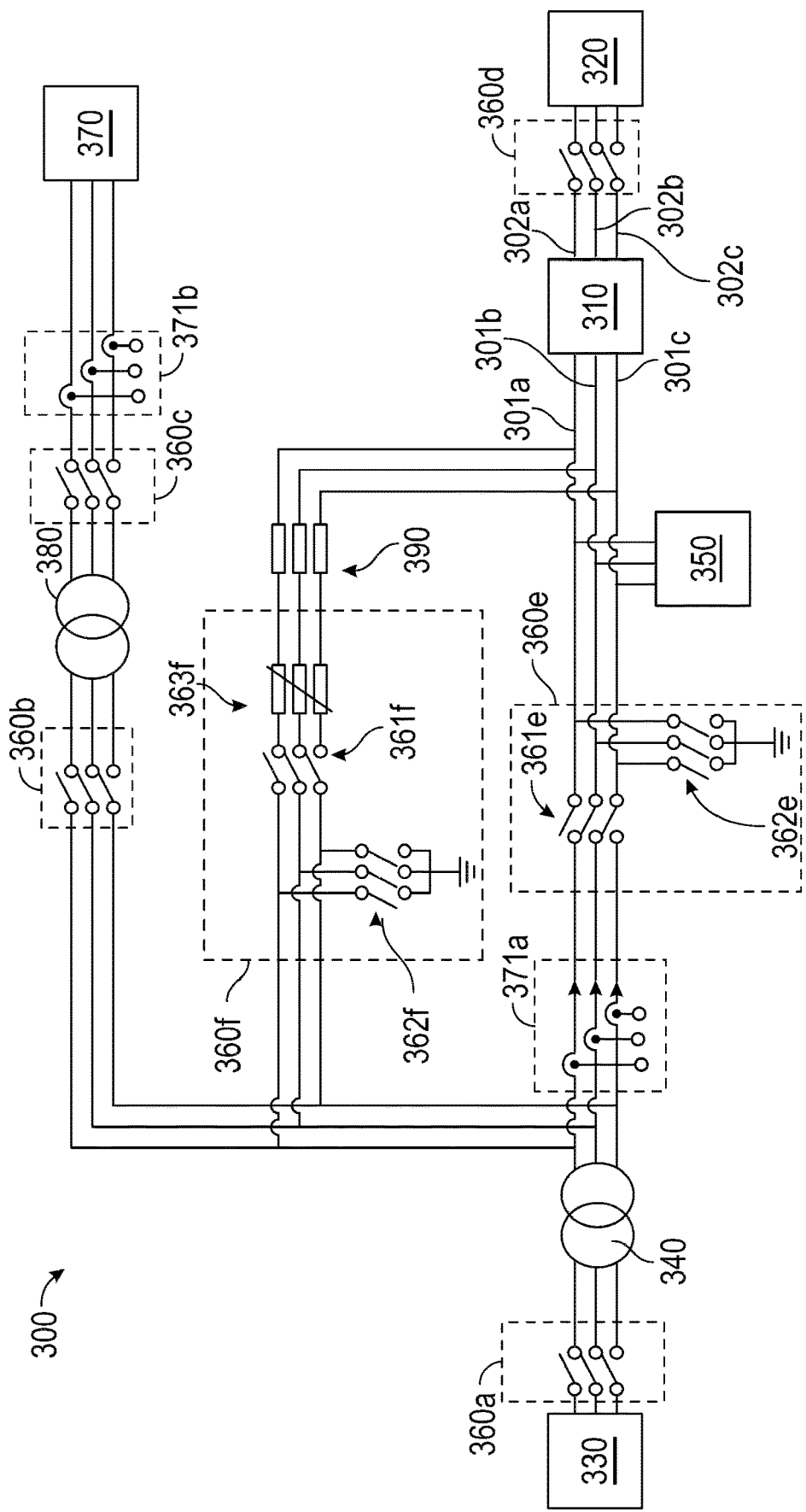
FIG. 3 illustrates a schematic of a power conversion and transmission system, according to embodiments of the present disclosure.

FIG. 3 illustrates a schematic of a power conversion and transmission system (PCTS) 300, according to embodiments of the present disclosure. As will be appreciated, the configuration shown is but one example of a schematic of a PCTS 300, and should not be considered as limiting use of the disclosed embodiments. One of ordinary skill in the art will appreciate alternative arrangements of the presented components, substitutions for the presented components, and the omission of various components are contemplated as being within the scope of the present disclosure.

The PCTS 300 illustrated in FIG. 3 is a three-phase system that carries power of three different phases on three separate transmission lines 301a-c (generally, transmission line 301), although PCTS 300 of one, two, or more phases with a corresponding number of transmission lines 301a-N can also employ the teachings of the present disclosure. Unless stated otherwise or when clear from the context of the present disclosure, each component of the PCTS 300 either includes N instances, where each instance a-N is associated with one phase a-N, or is connected to each of the N phases.

In the PCTS 300, a converter system 310 receives alternating current (AC) power from a generator 320 (e.g., a WTG 100) on a number of generator lines 302a-c (generally, generator line 302) corresponding to a number of phases of power generated by the generator 320. When the generator 320 produces power to supply to the grid 330, the converter system 310 rectifies the AC power to a direct current (DC) power, and inverts the DC power to another AC power that is suitable to be supplied to a power grid 330 via the transmission lines 301. In various embodiments, the frequency that the power grid 330 receives power can be different than the frequency at which the generator 320 provides power. The components of a three-phase converter system 310 are discussed in more detail in regard to FIG. 4. A power grid transformer 340 can adjust the voltage of the AC power output by the converter system 310 to an appropriate voltage for the power grid 330 (e.g., a grid voltage), and a harmonic filter 350 connected to the transmission lines 301 between the converter system 310 and the grid transformer 340 (or grid 330) can be used to condition and adjust the AC power provided to the grid 330. The components of a three-phase harmonic filter 350 are discussed in greater detail in regard to FIG. 5.

Various additional components are included in the PCTS 300 to control the transfer of power to/from the converter system 310 and the grid 330, such as during start-up and connection or shutdown and disconnect procedures. A controller 900 (not illustrated in FIG. 3) in communication with various components and current or voltage sensors 371a, 371b (generally, sensors 371) disposed throughout the PCTS 300 may control the operation of the generator 320, auxiliary power source (APS) 370, auxiliary transformer 380, and/or various switches to affect whether and how power is provided to/from the grid 330 or components within the PCTS 300. The controller 900 may be fed power from the APS 370 and is in communication with the various components of the PCTS 300 via wireless channels or wired connections (not illustrated). The components of a controller 900 are discussed in greater detail in regard to FIG. 9.

Several circuit breakers and/or contactors 360a-f (generally, circuit breaker or contactor 360) are disposed at various points in the PCTS 300 to direct or block the transmission of power to/from particular portions of the PCTS 300. For example, a grid circuit breaker 360a disposed between the grid 330 and the grid transformer 340 can act as a Point of Common Coupling (PCC) between the PCTS 300 and the grid 330 to connect or disconnect the PCTS 300 to/from the grid 330. In another example, an auxiliary transformer circuit breaker 360b and an APS circuit breaker 360c can connect or disconnect an auxiliary transformer 380 to/from the converter system 310 and the APS 370 respectively. In some embodiments, the auxiliary transformer circuit breaker 360b is a medium voltage circuit breaker disposed between the grid 330 and the auxiliary transformer 380 to isolate the auxiliary transformer 380 from faults or during service/inspection on the primary side. In some embodiments, the APS circuit breaker 360c is a low voltage circuit breaker disposed between the auxiliary transformer 380 and the APS 370 to protect against faults on the APS side (or secondary side) of the auxiliary transformer 380 or during de-energization of the auxiliary equipment powered via the APS 370.

Similarly, a generator circuit breaker 360d disposed between the generator 320 and the converter system 310 can connect or disconnect the generator 320 to/from the converter system 310.

A transmission circuit breaker 360e is disposed on a first path between the converter system 310 (and the harmonic filter 350) and the grid transformer 340. The transmission circuit breaker 360e can include a first set of switches 361e to make or break electrical contact on the electrical transmission lines 301 between the converter system 310 and the grid 330, and a second set of switches 362e to make or break electrical contact on an electrical pathway between ground and the transmission lines 301.

A pre-charging contactor 360f is disposed on a second path in the PCTS 300. The second path may alternatively be referred to as a pre-charge path, as the second path provides an alternative pathway around the transmission circuit breaker 360e (i.e., connects to the transmission lines 301 both a first point upstream and a second point downstream of the first set of switches 361e of the transmission circuit breaker 360e) and is used when pre-charging the converter system 310. The pre-charging contactor 360f can include a first set of switches 361f to make or break electrical contact on the electrical transmission lines 301 between the converter system 310 and the power grid 330, and a second set of switches 362f to make or break electrical contact on an electrical pathway between ground and the transmission lines 301. The pre-charging contactor 360f also includes (or can be associated with) a set of fuses 363f on the transmission lines 301 and a set of pre-charge resistors 390, which ensure that a pre-charging current provided from the power grid 330 does not exceed the designed capabilities of the converter system 310. The pre-charge resistors 390 are provided with a predefined resistance, which is selected based on the impedance of the harmonic filter 350.

By opening and closing the transmission circuit breaker 360e, the controller 900 blocks or allows (respectively) current from the grid 330 to flow over the first path through the transmission circuit breaker 360e to the converter system 310. Similarly, by opening and closing the pre-charging contactor 360f, the controller 900 blocks or allows (respectively) current from the grid 330 to flow over the second path through the pre-charging contactor 360f to the converter system 310. Due to the presence of the pre-charge resistors 390 on the second path and lack of similar resistors on the first path, current prefers to flow over the first path when both paths are available. Therefore, to force current to flow through the pre-charge resistors 390, the controller 900 blocks the first path (i.e., opens the transmission circuit breaker 360e) and allows the second path (i.e., closes the pre-charging contactor 360f) when pre-charging the converter system 310.

When pre-charging and synchronizing using power from the grid 330, the first set of switches 361f in the pre-charging contactor 360f and the switches in the grid circuit breaker 360a are closed. Meanwhile, the first set of switches 361e, in the transmission circuit breaker 360e, the second set of switches 362e in the transmission circuit breaker 360e, the second set of switches 362f in the pre-charging contactor 360f, the switches in the generator circuit breaker 360d are open, and the switches in the auxiliary transformer circuit breaker 360b are closed. Thus, power from the grid 330 flows on the transmission lines 301 into the PCTS 300 and over the pre-charge resistors 390 to the harmonic filter 350 and the converter system 310.

Figure 4:
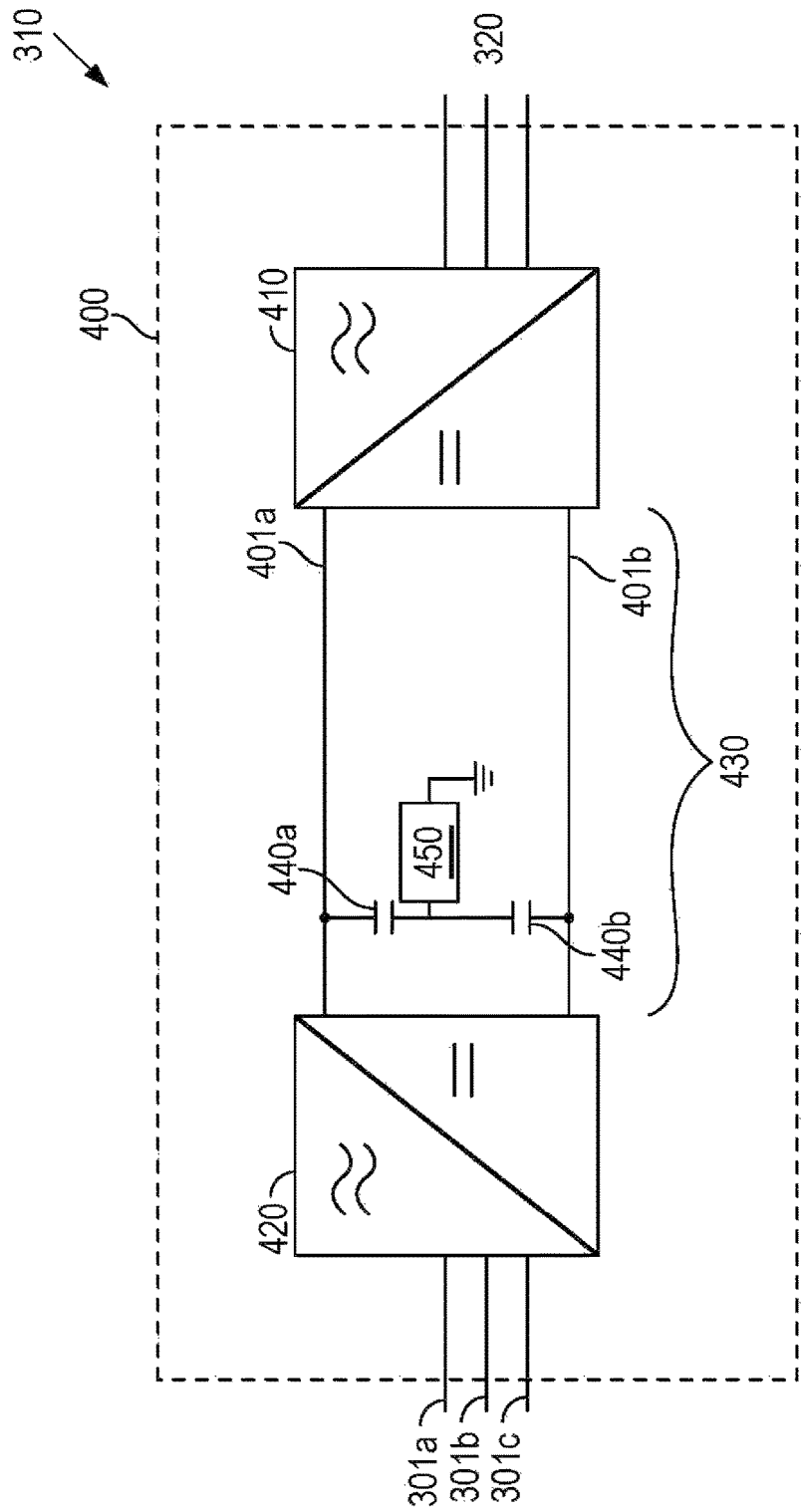
FIG. 4 is a schematic of a Modular Multilevel Converter for use as a converter system, according to embodiments of the present disclosure.

FIG. 4 is a schematic of an MMC 400 for use as a converter system 310 according to embodiments of the present disclosure. FIG. 4 may be understood in conjunction with FIG. 3. The MMC 400 operates by converting the AC power supplied by the generator 320 to DC power via a Machine Side Converter (MSC) 410, and from DC power back to AC power for supply to the grid 330 via a Line Side Converter (LSC) 420. The MSC 410 and the LSC 420 are coupled together via a DC link 430. Various switches in the MSC 410 and LSC 420 control how the MMC 400 is charged or discharged and how power is rectified or inverted, which may be controlled by the controller 900 or another subordinate or independent control device. Each of the MSC 410 and the LSC 420 include several cells, which can be modularly added or removed from the converters in series with one or more other cells to adjust the capabilities of the converters in handling different voltage inputs and outputs when converting power from AC to DC or from DC to AC. The cells include various switches and capacitors, which are discussed in greater detail in regard to FIGS. 6A-6E.

The DC link 430 carries DC power between the MSC 410 and the LSC 420 on a first rail 401a and a second rail 401b (generally, rail 401), and includes DC-link capacitors 440a-b (generally, DC-link capacitor 440) disposed between the rails 401. In various embodiments, the DC-link capacitors 440 regulate a DC voltage between the MSC 410 and the LSC 420. In some embodiments, the DC-link capacitors 440 are connected to a neutral (common) voltage node connected to earth ground through a transmission resistor 450 and the non-common terminals of the DC-link capacitors 440 are connected to opposing DC-link voltage rails 401 (e.g., to one of a positive or a negative rail 401). Although shown in FIG. 4 as having two DC-link capacitors 440, the DC-link may include more or fewer DC-link capacitors 440 (including none) in other embodiments.

An operator pre-charges the DC-link capacitors 440 and the capacitors in the MSC 410 and LSC 420 before connecting the generator 320 to the grid 330 (via the converter system 310 and associated circuit breakers 360) to reduce the amount of inrush current. Generally, when pre-charging the capacitors, the controller 900 manages the switches in the MMC 400 to gradually build power across the rails 401 to charge the capacitors to store a threshold voltage before connecting the converter system 310 to the generator 320. The generator 320 is soft started via the MSC 410 and are at a standstill until the MMC 400 has completed pre-charge. As described herein, the pre-charging of the capacitors is performed in parallel (i.e., at substantially the same time) with the synchronization of the harmonic filter 350 to the grid power.

Figure 5:
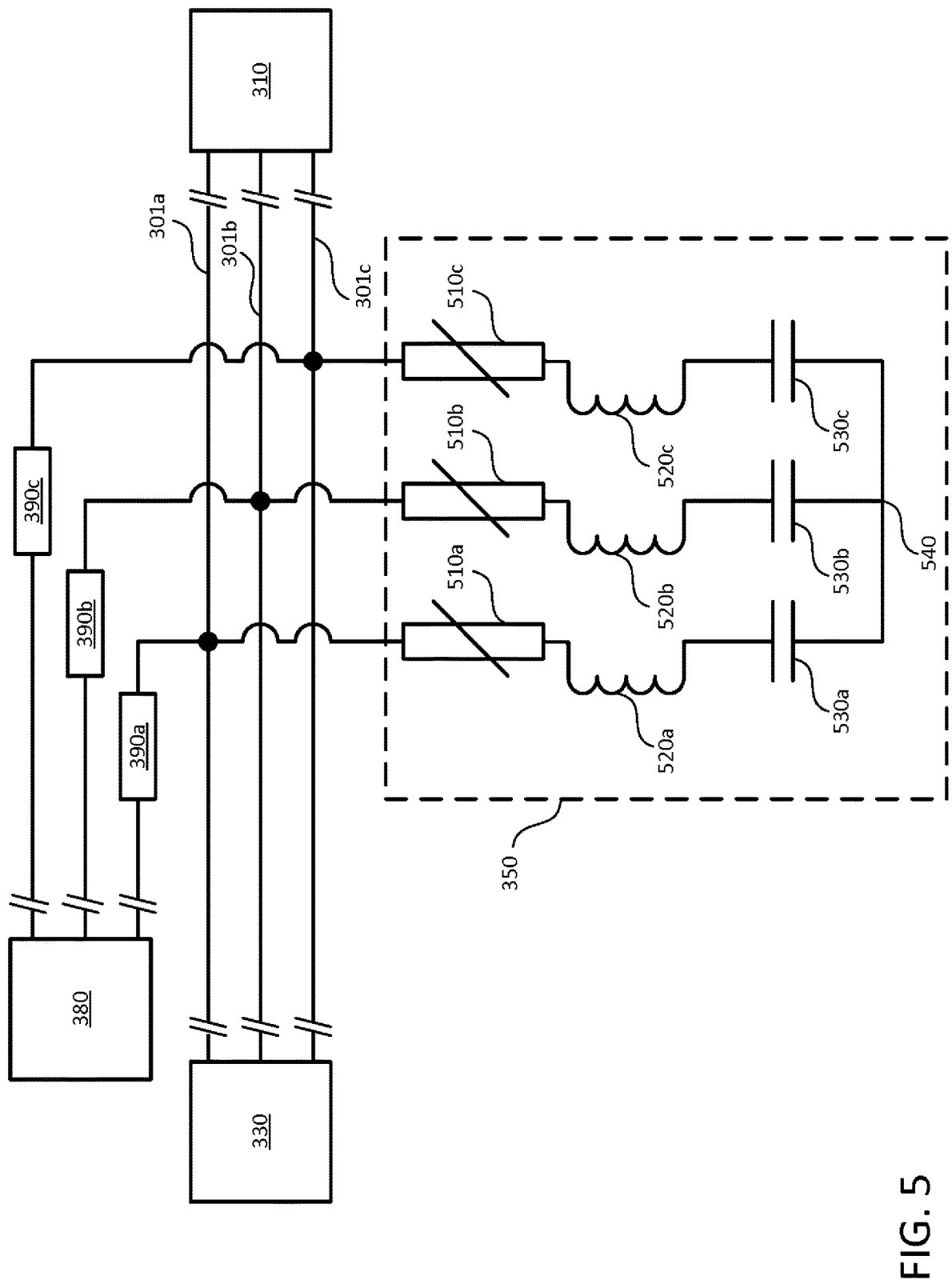
FIG. 5 is a schematic of a harmonic filter, according to embodiments of the present disclosure.

FIG. 5 is a schematic of a harmonic filter 350 according to embodiments of the present disclosure. FIG. 5 may be understood in conjunction with FIG. 3. The harmonic filter 350 is shunt connected with the transmission lines 301 between the converter system 310 and the grid 330. The harmonic filter 350 mitigates the risks and effects of different current frequencies between the grid 330 and the converter system 310 causing harmonic currents in the PCTS 300 using a set of resonant circuits connected to each transmission line 301. Although illustrated as a single-tuned filter, the harmonic filter 350 may be a double-tuned filter, high-pass filter, etc., in other embodiments.

As illustrated, the harmonic filter 350 includes, connected on a first side to each corresponding transmission line 301, filter fuses 510a-c (generally, filter fuse 510), inductors 520a-c (generally, filter inductors 520), and filter capacitors 530a-c (generally, filter capacitors 530) that are connected on a second side to a shared node 540. The filter fuses 510 protect the filter inductors 520 and filter capacitors 530 on the same line from over currents from the transmission line 301 associated with a difference between the grid voltage and the stored voltage in the harmonic filter 350.

The filter inductors 520 are selected to have a filter inductance of $L_f$, and the filter capacitors 530 are selected to have a filter capacitance of $C_f$ that result in a filter impedance at grid frequency (generally, 50 Hz or 60 Hz±10%) that is significantly higher than the resistance $R_{pre}$ of the pre-charge resistors 390 (i.e., $|Z_{filter}|>>R_{pre}$). In various embodiments, the resistance $R_{pre}$ is less than 10% of the filter impedance $Z_{filter}$ (i.e., $0.1*|Z_{filter}|>R_{pre}$). When the resistance $R_{pre}$ of the pre-charge resistors 390 is negligible compared to the impedance of the harmonic filter 350, the voltage drop over the pre-charge resistors 390 is also negligible, and the voltage $V_f$ of the harmonic filter 350 and the grid voltage $V_g$ are substantially equal in magnitude (e.g., $|V_g|-5\% \leq |V_f| \leq |V_g|$). Accordingly, for an angular speed of ω, based on the grid frequency f (e.g., ω=2πf), the values for the pre-charge resistors 390, filter inductors 520, and filter capacitors 530 are selected according to Formula 1.

$$\frac{1}{\omega C_f} - \omega L_f \gg R_{pre} \tag{1}$$

FIG. 6A-6E are a series of schematics of dual-cells 600 in various modes of operation, according to embodiments of the present disclosure. Each of the dual-cells 600 in FIGS. 6A-6E allow for rectification or inversion of current by the controlled switching and discharge of the components therein. For ease of reference, a series of nodes 610a-e (generally, node 610 or cell node) are provided in each of the dual-cells 600. A first node 610a and a fifth node 610e are contacts for the dual-cell 600 by which the dual-cell 600 can be connected to another dual-cell 600, a rail 402, arm reactor 710 (discussed in relation to FIGS. 7A and 7B), or other component external to the dual-cell 600.

The illustrated dual-cells 600 include a first cell capacitor 620a (generally, cell capacitor 620) disposed between a second node 610b and a third node 610c, and a second cell capacitor 620b disposed between the third node 610c and a fourth node 610d. Although illustrated as four-switch, two-capacitor cells, other cells with more or fewer switches and capacitors may be used in other embodiments. For example, two two-switch, one-capacitor cells may be treated as one four-switch, two-capacitor cell if arranged to exhibit similar component-to-node arrangements.

The switches 630a-d (generally, switch 630 or cell switch) are arranged in parallel with corresponding diodes 640a-d (generally, diode 640), and are driven open or closed to define various operating modes in the dual-cell 600. A first switch 630a and first diode 640a are disposed between the first node 610a and the second node 610b, wherein the first diode 640a is biased to block current flowing from the second node 610b to the first node 610a. A second switch 630b and second diode 640b are disposed between the first node 610a and the third node 610c, wherein the second diode 640b is biased to block current flowing from the first node 610a to the third node 610c. A third switch 630c and third diode 640c are disposed between the third node 610c and the fifth node 610e, wherein the third diode 640c is biased to block current flowing from the third node 610c to the fifth node 610e. A fourth switch 630d and fourth diode 640d are disposed between the fifth node 610e and the fourth node 610d, wherein the fourth diode 640d is biased to block current flowing from the fifth node 610e to the fourth node 610d.

When driven to a closed state by the controller 900, the switches 630 provide a pathway that bypasses the associated diode 640, thus allowing current to flow counter to the bias of the associated diode 640 and thereby bypass one or more cell capacitors 620 in the dual-cell 600. Although illustrated as Insulated-Gate Bipolar Transistors (IGBT), the switches 630 may include other power semiconductor devices (e.g., a power Metal Oxide Semiconductor Field Effect Transistor (MOSFET) or Bipolar Junction Transistor (BJT)). The controller 900 (not illustrated) can thereby control whether a given switch 630 is open or closed by controlling the gate of the associated power semiconductor device. The paired switches 630 and diodes 640 may be included in a single package or integrated component, or may be provided as discrete circuit components.

Although the present disclosure primarily discusses dual-cells 600, single-cells (or paired single-cells functionally forming a dual-cell 600) may be freely substituted for dual-cells 600 in other embodiments. A single-cell, in contrast to a dual-cell 600, includes one cell capacitor 620 and two switches 630 (with associated diodes 640); effectively half of a dual-cell 600. The modes of operation of a single-cell include a natural bypass mode (in which the switches 630 are not conducting), a natural blocked mode (in which current flows over the cell capacitor 620), and a forced blocked mode (in which the switches 630 are conducting to avoid charging the cell capacitor 620).

Figure 6A:
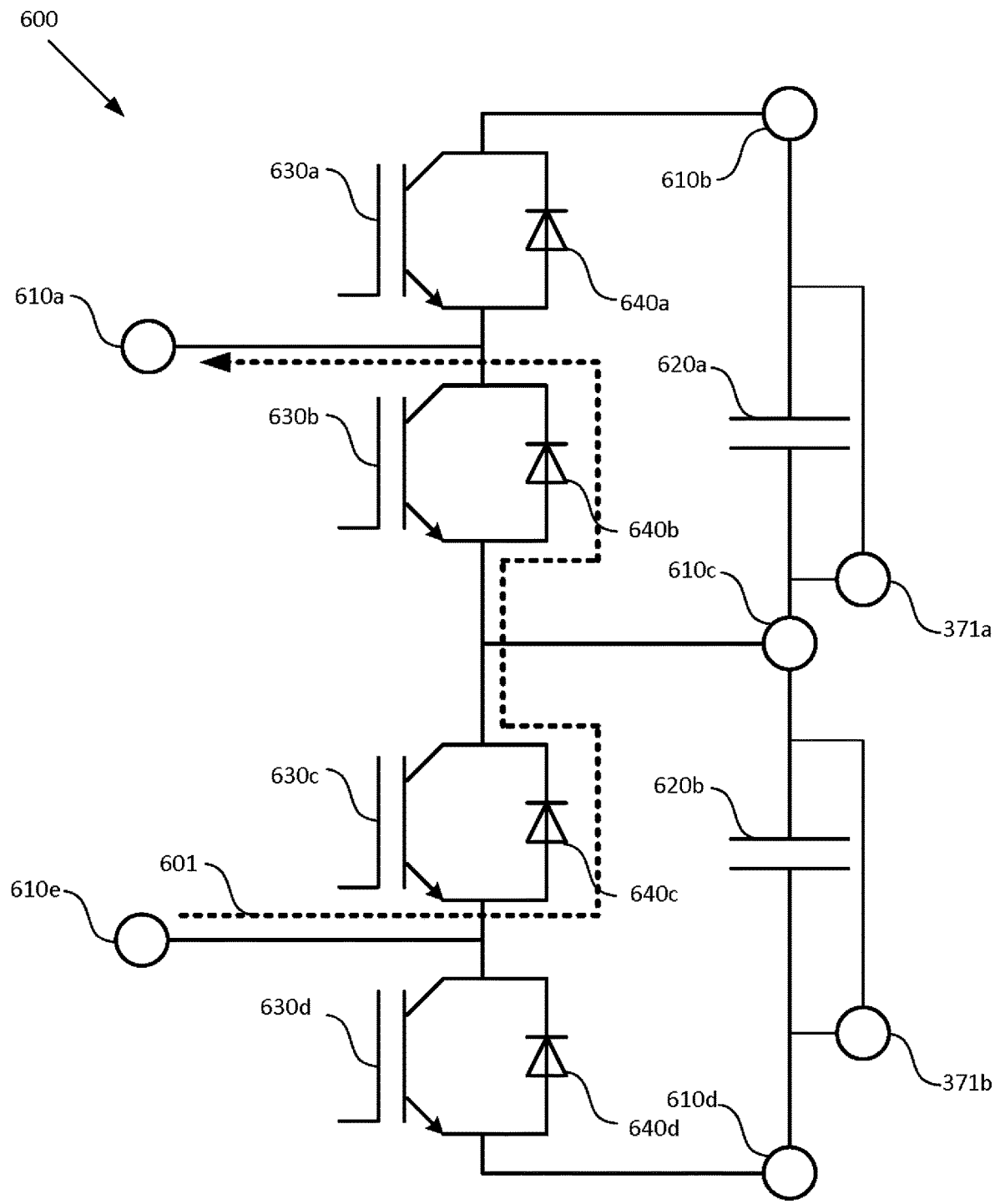
FIGS. 6A-6E are a series of schematics of cells in various modes of operation, according to embodiments of the present disclosure.

FIG. 6A illustrates a natural bypass mode of operation of a dual-cell 600, where a first current flow 601 runs from the fifth node 610e, through the third diode 640c to the third node 610c, and through the second diode 640b to the first node 610a. In the natural bypass mode, the switches 630 are not conducting. The natural bypass mode is achieved without driving the switches 630 (i.e., all of the switches 630 may remain open); current naturally flows from the fifth node 610e to the first node 610a when a higher voltage is applied to the fifth node 610e than the first node 610a.

Figure 6B:
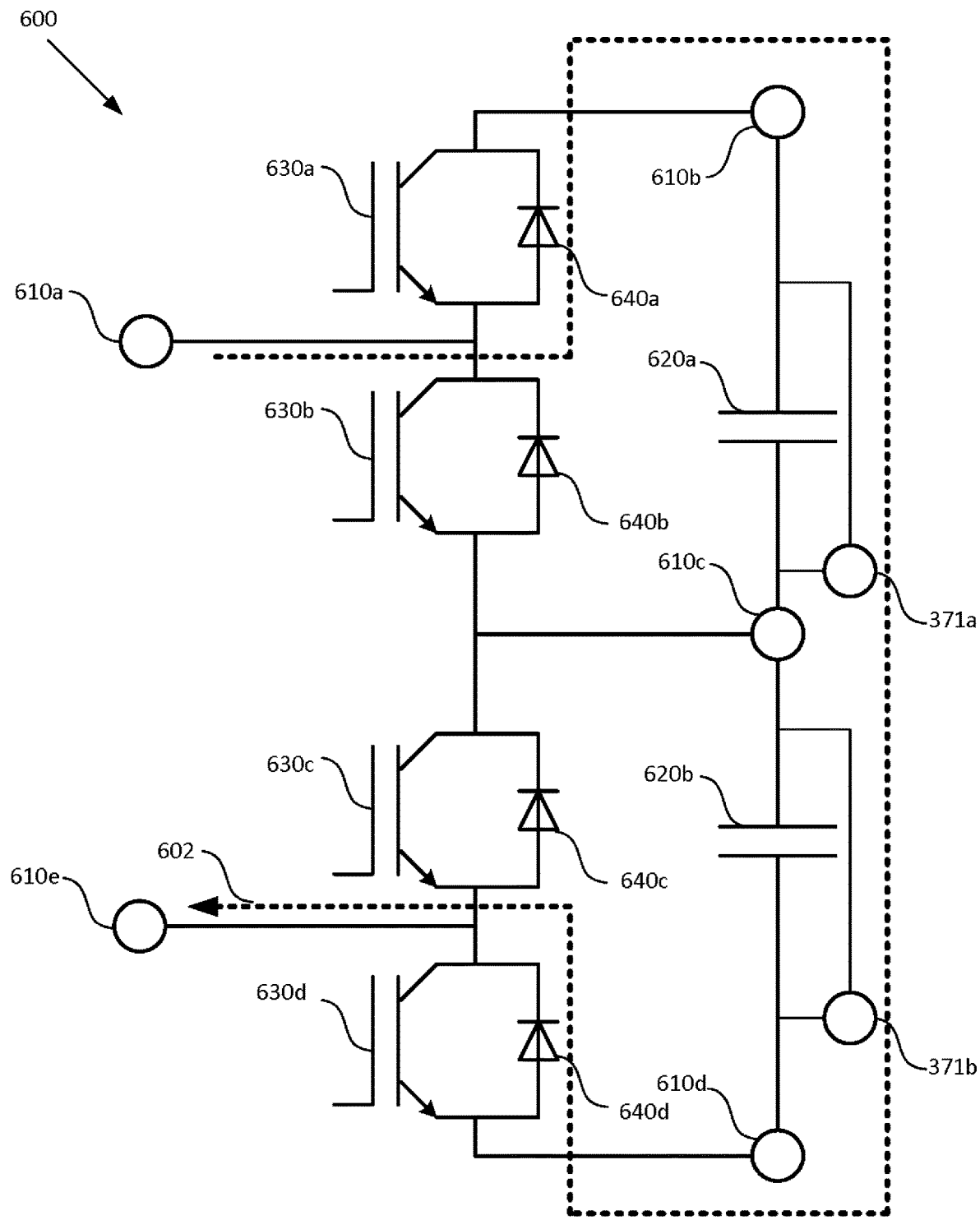

FIG. 6B illustrates a natural blocked mode of operation of a dual-cell 600, where a second current flow 602 runs from the first node 610a, through the first diode 640a, first cell capacitor 620a, and second cell capacitor 620b to the fourth node 610d, and through the fourth diode 640d to the fifth node 610e. In the natural blocked mode, the switches 630 are open, and the second current flow 602 flowing over the cell capacitors 620 charges the cell capacitors 620. The natural blocked mode is achieved without driving the switches 630 (i.e., all of the switches 630 may remain open); current naturally flows from the first node 610a to the fifth node 610e over the cell capacitors 620 when a higher voltage is applied to the first node 610a than the fifth node 610e.

Figure 6C:
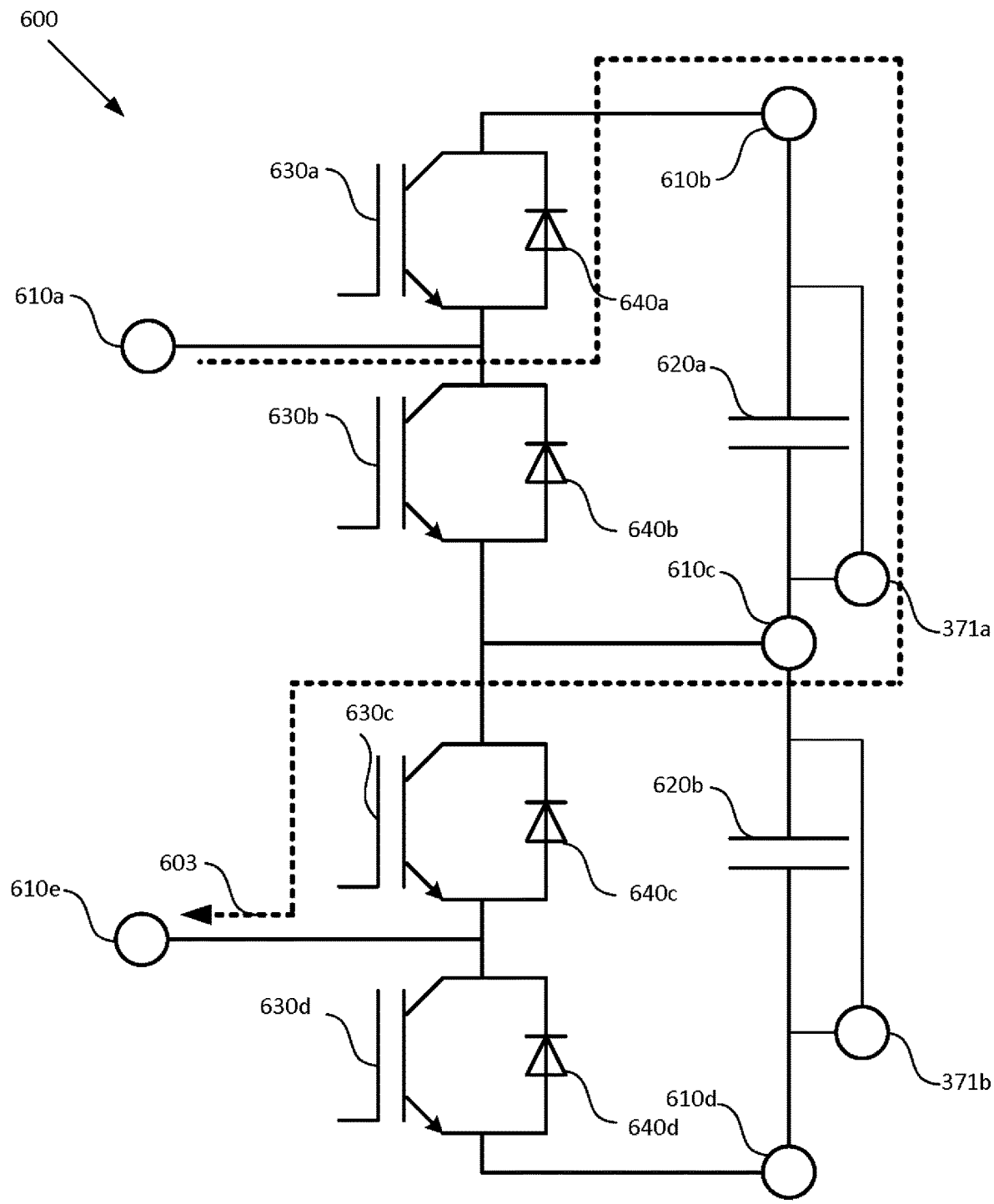

FIG. 6C illustrates a first forced bypass mode of operation of a dual-cell 600, where a third current flow 603 runs from the first node 610a, through the first diode 640a and first cell capacitor 620a to the third node 610c, and through the closed third switch 630c to the fifth node 610e. In the first forced bypass mode, the first, second, and fourth switches 630a, 630b, 630d are open, and the third switch 630c is closed, thus charging the first cell capacitor 620a, and not charging the second cell capacitor 620b.

Figure 6D:
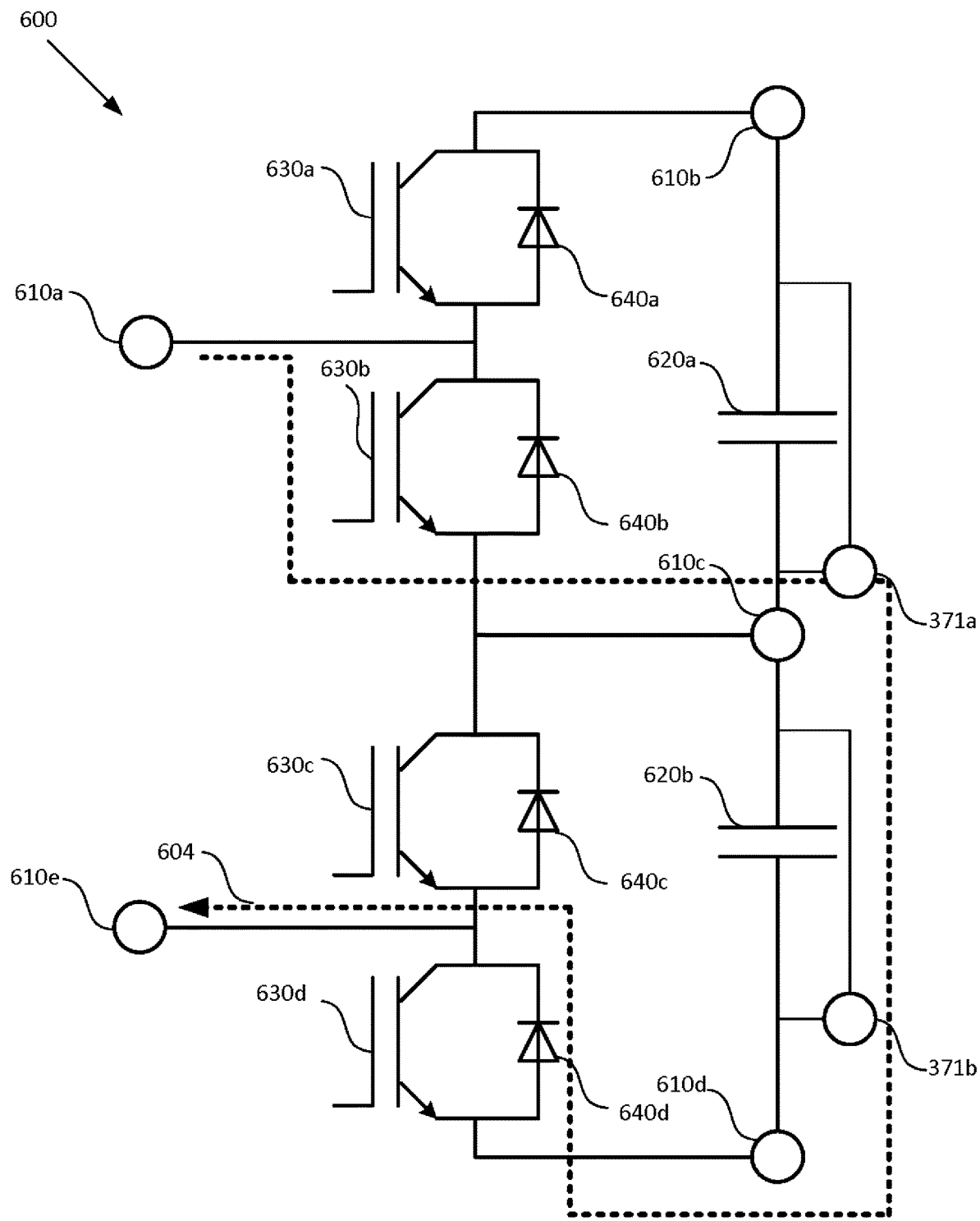

FIG. 6D illustrates a second forced bypass mode of operation of a dual-cell 600, where a fourth current flow 604 runs from the first node 610a, through the closed second switch 630b to the third node 610c, and second cell capacitor 620b to the fourth node 610d, and through the fourth diode 640d to the fifth node 610e. In the second forced bypass mode, the first, third, and fourth switches 630a, 630c, 630d are open, and the second switch 630b is closed, thus charging the second cell capacitor 620b, and not charging the first cell capacitor 620a.

Figure 6E:
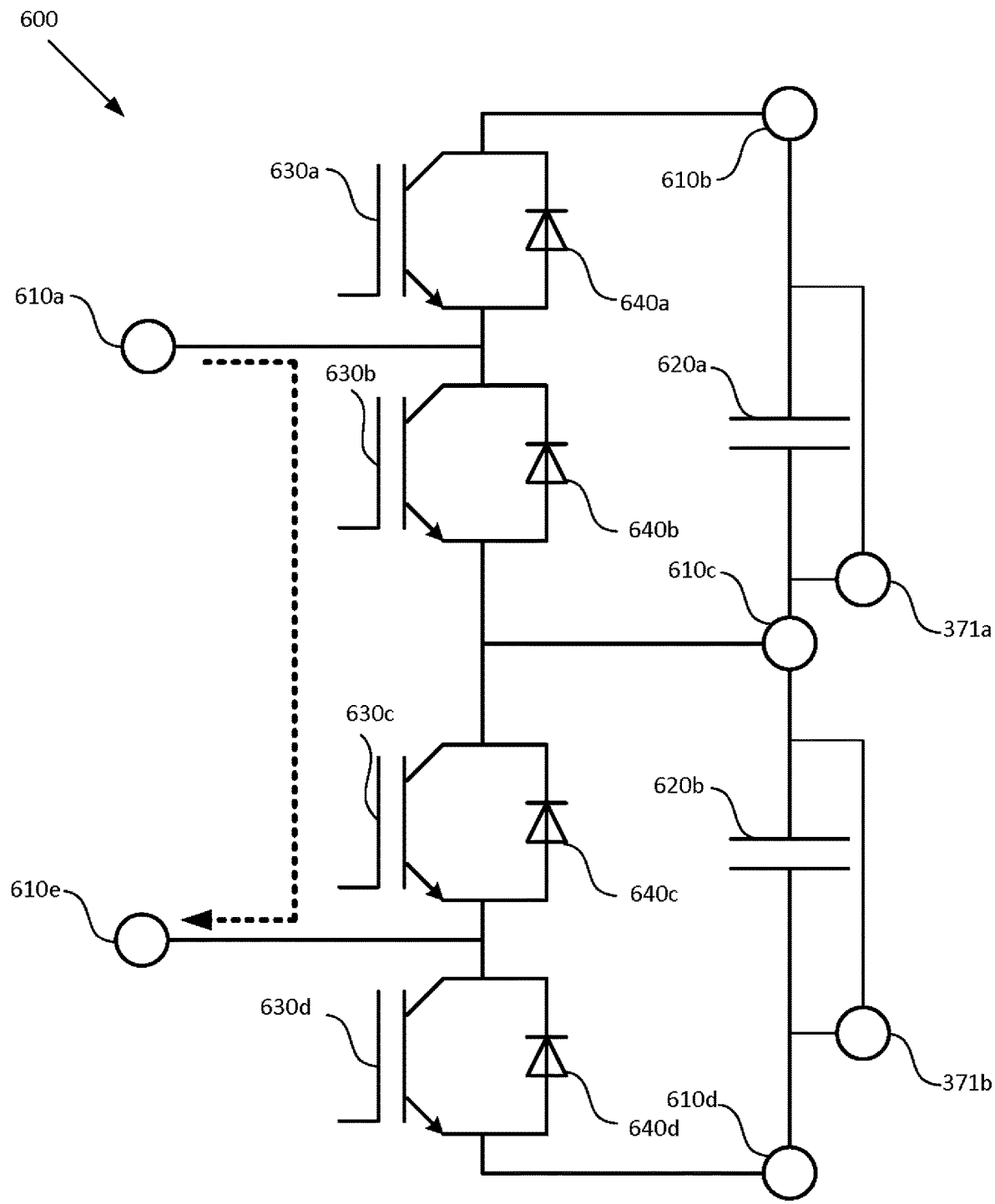

FIG. 6E illustrates a third forced bypass mode of operation of a dual-cell 600, where a fifth current flow 605 runs from the first node 610a, through the closed second switch 630b to the third node 610c, and through the closed third switch 630c to the fifth node 610e. In the third forced bypass mode, the first and fourth switches 630a, 630d are open, and the second and third switches 630b, 630c are closed, thus bypassing and not charging the cell capacitors 620.

In each of the forced bypass modes illustrated in FIGS. 6C-6E, the selective closing of one or more switches 630 alters the pathway that current flows from the first node 610a to the fifth node 610e, thus altering how the cell capacitors 620 charge compared to the natural blocked mode of FIG. 6B. When the same voltage is applied across the dual-cell 600, the voltage may be divided across the two cell capacitors 620 (as per the natural block mode), directed solely across one cell capacitor 620 (as per the first and second forced bypass modes), or none of the cell capacitors 620 (as per the third forced bypass mode). When in the natural block mode, the voltage $V_{cell}$ in the N cell capacitors 620 of a given phase arm may be given as per Formula 2, where $V_{peak}$ is the peak phase-to-phase voltage of the grid 330 or power source used in pre-charging.

$$V_{cell}=V_{peak}\div N \quad (2)$$

In contrast, when in the first or second forced bypass mode, one or more cell capacitors 620 are bypassed; dividing the voltage over fewer cell capacitors 620 and allowing for a higher charge in the non-bypassed cell capacitors 620, which may be expressed according to Formula 3, where K is the number of cell capacitors 620 bypassed (i.e., over which current does not flow).

$$V_{cell}=V_{peak}\div(N-K) \quad (3)$$

The controller 900 selects which dual-cells 600 to operate in a given mode of operation to selectively charge the sum of voltages on the cell capacitors 620 up to the peak voltage $V_{peak}$ (less any voltage drops across the diodes 640 and resistive losses) or another pre-charging threshold set by an operator. Various sensors 371 (e.g., voltage probes 371a-b across the cell capacitors 620a-b) allow the controller 900 to measure how the cell capacitors 620 are charging, and for the controller 900 to balance how quickly individual or a subset of the cell capacitors 620 are charging by controlling the switches 630 to charge or not charge the associated cell capacitors 620 at a given time when pre-charging the MMC 400.

Figure 7A:
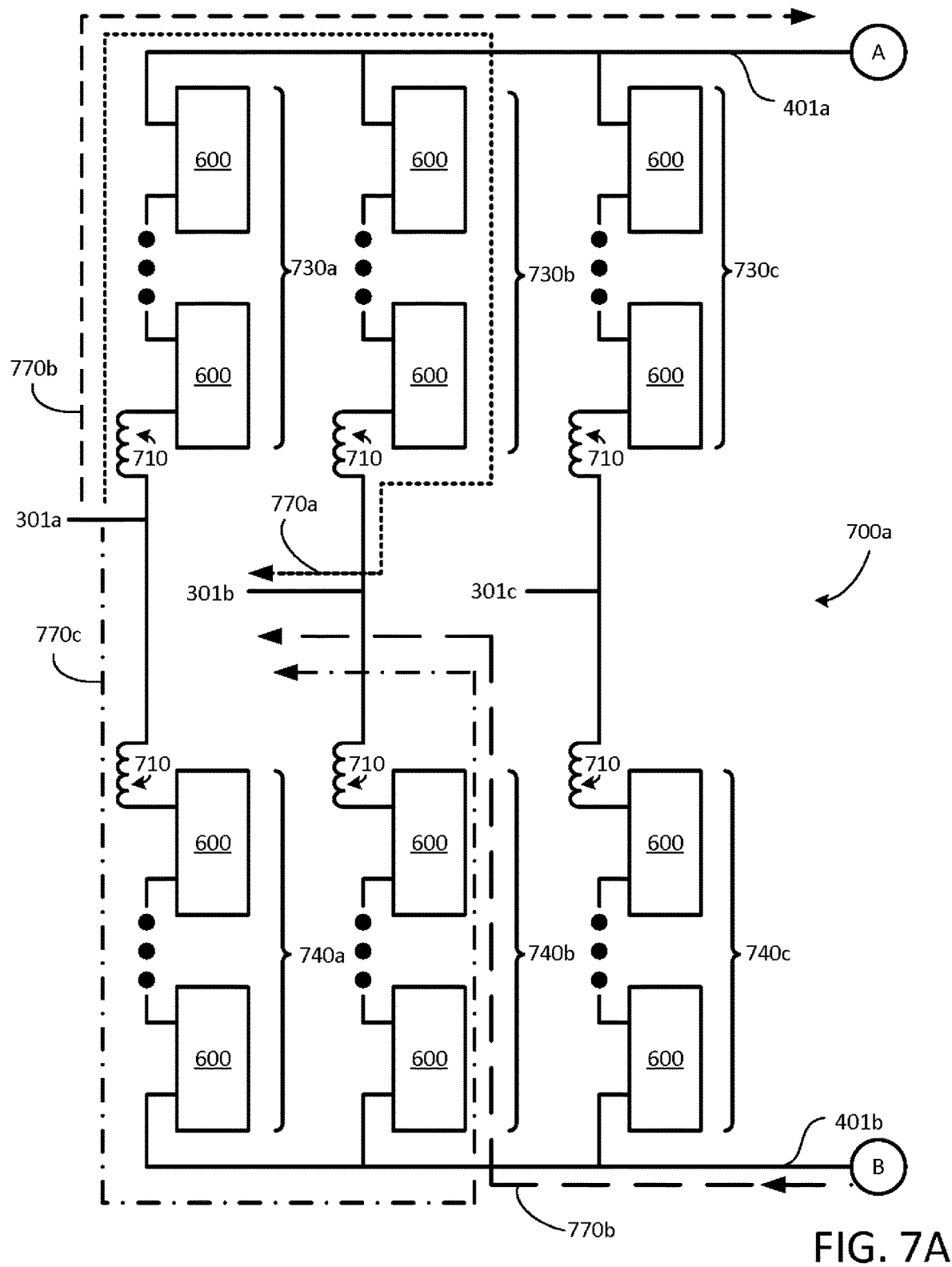
FIGS. 7A and 7B illustrate operations of the Line Side Converter and Machine Side Converter, according to embodiments of the present disclosure.
Figure 7B:
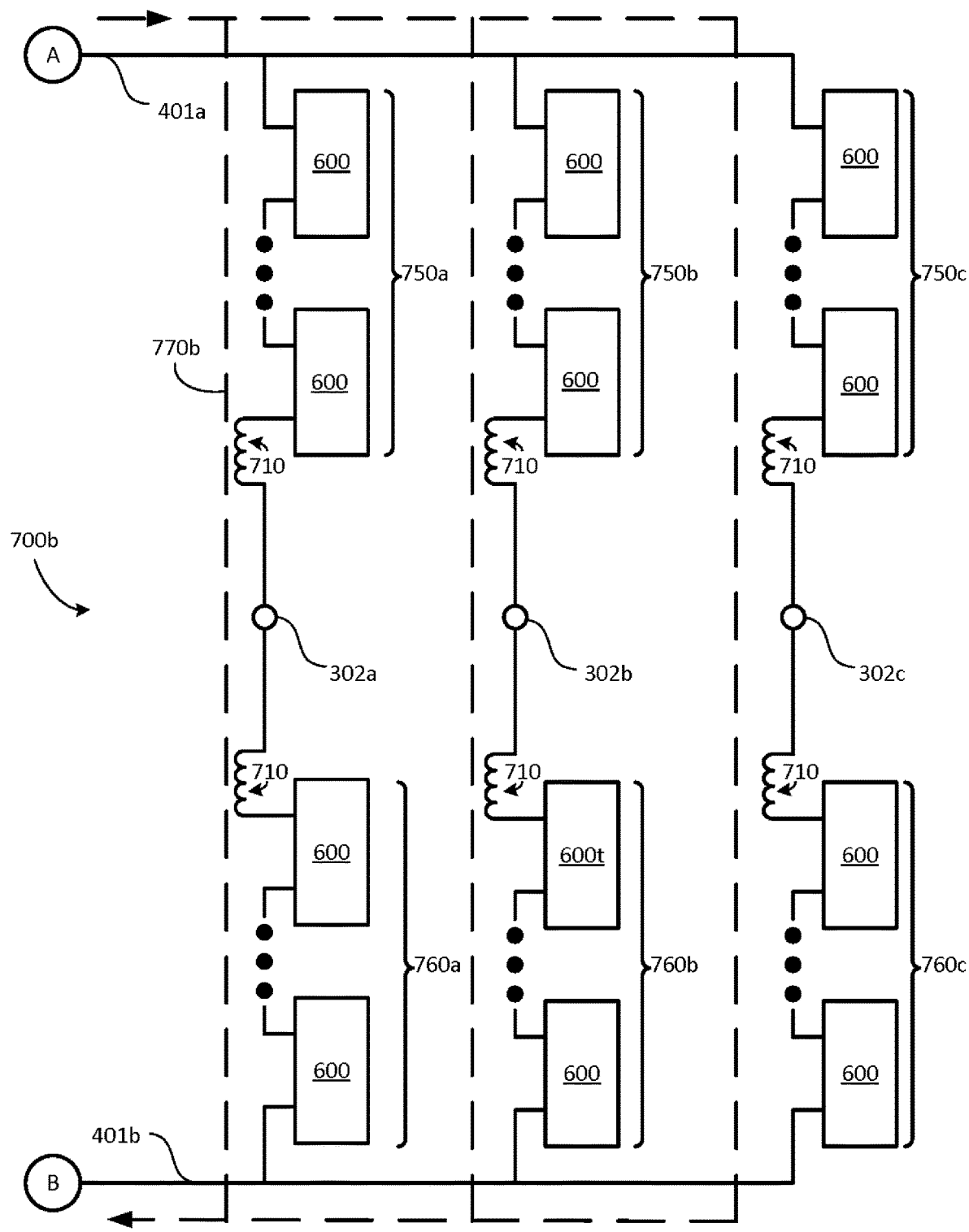

FIGS. 7A and 7B illustrate the LSC 420 and MSC 410 respectively in association with the charging paths for a phase AB positive current (i.e., $V_{ab}>0$), according to embodiments of the present disclosure. Charging currents for the other phases (i.e., BC, AC), and negative currents thereof, have been omitted from FIGS. 7A and 7B for clarity, but are contemplated by the present disclosure. The LSC layout 700a in FIG. 7A may be understood to be linked with the MSC layout 700b in FIG. 7B by node A on the first rail 401a (as a positive rail 401 in the present example), and node B on the second rail 401b (as a negative rail 401 in the present example).

The LSC layout 700a for a three-phase MMC 400 includes three legs connected between the transmission lines 301 and the rails 401, each connected to a respective one of the three transmission lines 301a-c. Each leg includes a plurality of dual-cells 600, of which half are disposed between the corresponding transmission lines 301a-c and the first rail 401a, and may be referred to as a positive arm 730a-c (generally, positive arm 730 or positive LSC arm) based on the corresponding transmission line 301a-c. The other half of the dual-cells 600 are disposed between the corresponding transmission line 301 and the second voltage rail 401b, and may be referred to as a negative arm 740a-c (generally, negative arm 740 or negative LSC arm) based on the corresponding transmission line 301a-c. Each half of the legs is also associated with a leg inductance, represented by a arm inductor 710.

The MSC layout 700b for a three-phase MMC 400 includes three legs connected between the generator lines 302 and the rails 401, each connected to a respective one of the three generator lines 302a-c. Each leg includes a plurality of dual-cells 600, of which half are disposed between the corresponding generator lines 302a-c and the first voltage rail 401a, and may be referred to as a positive arm 750a-c (generally, positive arm 750 or positive MSC arm) based on the corresponding generator line 302a-c. The other half of the dual-cells 600 is disposed between the corresponding generator line 302a-c and the second voltage rail 401b, and may be referred to as a negative arm 760a-c (generally, negative arm 760 or negative MSC arm) based on the corresponding generator line 302a-c. Each half of the legs is also associated with a leg inductance, represented by arm inductor 710.

Three current loops 770a-c (generally, current loop 770) are shown in FIGS. 7A and 7B flowing inward from the first transmission line 301a and outward to the second transmission line 301b.

The first current loop 770a carries current from the first transmission line 301a through the first positive arm 730a onto the first rail 401a, and from the first rail 401a through the second positive arm 730b to the second transmission line 301b.

The second current loop 770b carries current from the first transmission line 301a through the first positive arm 730a onto the first rail 401a, from the first rail 401a through the positive and negative MSC arms to the second rail 401b, and from the second rail 401b through the second negative arms 740b to the second transmission line 301b.

The third current loop 770c carries current from the first transmission line 301a through the first negative arm 740a onto the second rail 401b, and from the second rail 401b through the second negative arm 740b to the second transmission line 301b.

The dual-cells 600 in the first positive arm 730a and the second negative arm 740b are operated in the natural bypass mode (as per FIG. 6A), such that the first, second, and third current loops 770a-c do not charge the cell capacitors 620 in those dual-cells 600 (e.g., passing through the respective second and third diodes 640b-c).

A controller 900 may drive the cell switches to force the dual-cells 600 into a forced bypass mode (per FIGS. 6C-6E), or may leave the cell switches un-driven to leave the dual-cells 600 to conduct current in a natural mode of operation (per FIGS. 6A-6B).

When the controller 900 allows the dual-cells 600 in the LSC 420 and the MSC 410 to charge in an un-driven mode of operation (i.e., the switches 630 remain open for current to flow through the diodes 640 and the capacitors 620), the peak voltage $V_{peak}$ applied is across twice as many cell capacitors 620 in the MSC 410 relative to the LSC 420. Accordingly, the voltage in the cell capacitors 620 of an LSC 420 $V_{cell-LSC}$ and the voltage in the cell capacitors 620 of an MSC 410 $V_{cell-MSC}$ may equalize according to Formula 4, if the controller 900 does not drive the switches 630 to boost the voltages therein.

$$V_{cell-LSC}=2*V_{cell-MSC} \quad (4)$$

Once the controller 900 has completed the un-driven mode of operation, the controller 900 can then selectively drive one or more cells (e.g., turn on one or two bypass switches in a dual-cell 600) to boost the charge level in the cell capacitors 620. During the driven stage, the controller 900 drives the switches 630 in one or more dual-cells 600 such that selected dual-cells 600 operate any one of the natural modes of operations and the forced bypass modes of operation. For example, in the driven stage, the dual-cells 600 in the second positive arm 730b, the first negative arm 740a, and the MSC arms are operated in any one of the natural blocked mode, first forced bypass mode, second forced bypass mode, and third forced bypass mode (as per FIGS. 6B-6E receptively) to control how the cell capacitors 620 therein are charged. Details of cell charging are discussed in greater detail in regard to FIG. 8. The controller 900 may force a bypass mode in a given dual-cell 600 to boost the charging of the cell capacitors 620 in an arm in total close to $V_{peak}$, to account for manufacturing tolerances between cell capacitors 620 (e.g., to equalize the stored charge), etc.

Figure 8:
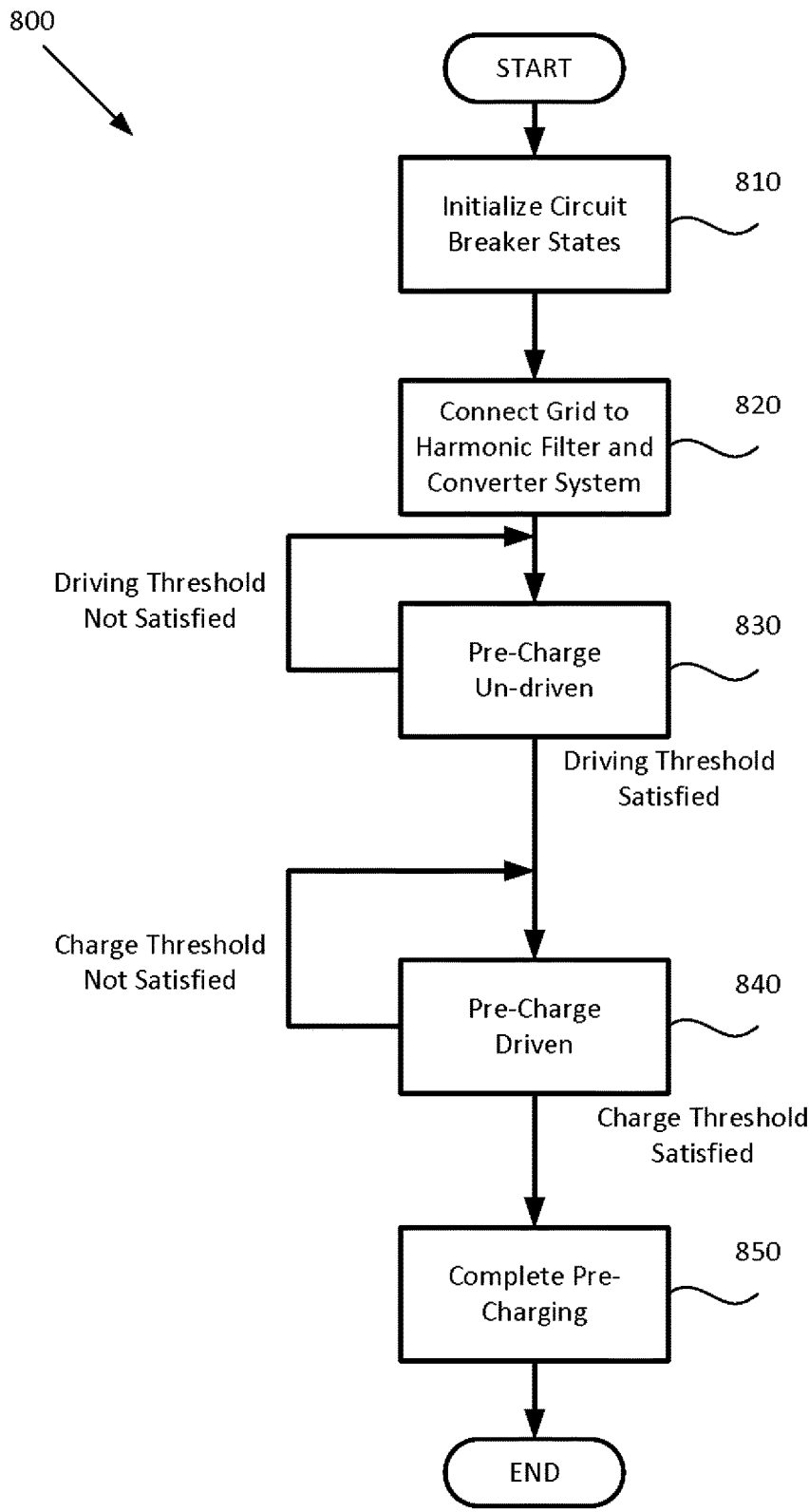
FIG. 8 is a flowchart for synchronizing a harmonic filter while pre-charging cells in a Modular Multilevel Converter, according to embodiments of the present disclosure.

FIG. 8 is a flowchart of a method 800 for synchronizing a harmonic filter 350 while pre-charging the dual cells 600 in an MMC 400, according to embodiments of the present disclosure.

Method 800 begins with block 810, where the controller 900 initializes the open/closed state of various circuit breakers 360. During pre-charging, a generator circuit breaker 360d remains open to disconnect the generator 320 from the converter system 310 being pre-charged. A first set of switches 361f in a pre-charging contactor 360f are closed and a first set of switches 361e in a transmission circuit breaker 360e are opened to direct power from the grid transformer 340 over a set of pre-charge resistors 390 before reaching the harmonic filter 350 and the converter system 310. The second sets of switches 362e, 362f in the transmission circuit breaker 360e and the pre-charging contactor 360f respectively remain open, unless the power from grid 330 needs to be shunted to ground (e.g. in cases where inspection or service is needed on the system).

Once the circuit breakers 360 are initialized at block 810, method 800 proceeds to block 820, where the controller 900 ensures that the grid circuit breaker 360a is closed to thereby connect the grid 330 to the harmonic filter 350 and the converter system 310 over the pre-charge resistors 390 and to provide power from the grid 330 (over the auxiliary transformer 380) to the APS 370 and controller 900.

At block 830, the MMC 400 enters into an un-driven stage of pre-charging, where the controller 900 monitors the status of the dual-cells 600 and the voltages of the cell capacitors 620, but does not drive the switches 630 in the dual-cells 600. The voltage in the harmonic filter 350 equalizes (less any voltage drops over the pre-charge resistors 390) with the grid voltage $V_g$, and the voltage $V_{cell-LSC}$ across the cell capacitors 620 in the LSC 420 equalizes to the peak phase-to-phase voltage of the grid 330 $V_{peak}$, divided by the number of cell capacitors 620 N in each arm of the LSC, and the voltage $V_{cell-MSC}$ across the cell capacitors 620 in the MSC 410 equalizes to the peak phase-to-phase voltage of the grid 330 $V_{peak}$, divided by the number of cell capacitors 620 N in each leg of the MSC (typically $V_{cell-LSC}=2*V_{cell-MSC}$). During block 830, the controller 900 leaves the switches 630 in all of the dual-cells 600 open; allowing current to flow through the dual-cells 600 according to the natural bypass mode or natural blocking mode (per FIGS. 6A and 6B, respectively).

Method 800 may remain at block 830 until a measured voltage satisfies a driving threshold. In some embodiments, the measured voltage may be a voltage $V_f$ stored in the filter capacitors 530 compared against a driving threshold based on the grid voltage $V_g$ (e.g., x % of $V_g$). In some embodiments, the measured voltage may be a voltage $V_{cell-LSC}$ in the one of the cell capacitors 620 (or an average, highest, or lowest $V_{cell-LSC}$ measured across several cell capacitors 620) compared against a driving threshold based on the peak phase-to-phase voltage $V_{peak}$ (e.g., x % of $V_{peak}\div N$). In some embodiments, the measured voltage may be a voltage $V_{cell-MSC}$ in the one of the cell capacitors 620 (or an average, highest, or lowest $V_{cell-MSC}$ measured across several cell capacitors 620) compared against a driving threshold based on the peak phase-to-phase voltage $V_{peak}$ (e.g., x % of $V_{peak}\div N$). Once the measured voltage satisfies the driving threshold, method 800 proceeds to block 840.

At block 840, the MMC 400 enters into a driven stage of pre-charging, where the controller 900 continues to monitor the status of the dual-cells 600 and the voltage of the cell capacitors 620, but may actively drive the switches 630 in the dual-cells 600 to boost the charge stored in the cell capacitors 620. The status of the dual-cells 600 can include the health of the various electronics included in the dual-cell 600, including the cell switches 630, communication and temperature sensors, pressure sensors, etc. In various embodiments, the controller 900 drives the switches 630 in the MSC 410 and the LSC 420 to decrease the number of cell capacitors 620 over which the voltage from the grid 330 is applied using the different forced bypass modes to gradually increase the voltage applied across the cell capacitors 620; applying the rectified or peak grid phase-to-phase voltage $V_{Peak}$ across a subset of the cell capacitors 620 over the diodes 640.

In a progressive driving schema to decrement one cell at a time how many dual-cells 600 are being simultaneously charged, for example for LSC 420, the controller 900 begins by placing one dual-cell 600 in each arm into the first or the second forced bypass mode and the rest of the dual-cells 600 in the natural blocking mode so that one cell capacitor 620 at a time is not charged, and the other cells capacitors 620 are charged to a voltage of $V_{cell}=V_{peak}\div(N-K)$, where K=1 due to one cell capacitor 620 being bypassed. In some embodiments, the controller 900 sweeps through which one cell capacitor 620 the current bypasses until all of the cell capacitors reach a voltage $V_{cell}=V_{peak}\div(N-1)$. The controller 900 can then proceed to increase the number of cell capacitors 620 bypassed at any given time by driving one or more dual-cells 600 into the first, second, or third forced bypass modes or leaving one or more dual-cells 600 in the natural blocked mode to that K increases and $V_{cell}=V_{peak}\div(N-K)$ increases accordingly. The controller 900 can thus cycle through which cell capacitors 620 are bypassed in an arm, and which are charged until a charge threshold is reached. Stated differently, when the controller 900 is ready to boost the cell voltage $V_{cell}$, the progressive driving schema employs iterative increases in the number of cell capacitors 620 bypassed at a given time relative to a preceding time (e.g., $K_1=K_0+1$) to thereby increase the voltage applied per non-bypassed cell capacitors 620.

In a halving driving schema to successively halve how many dual-cells 600 are being simultaneously charged, for example for MSC 410, the controller 900 begins by alternating between the first forced bypass mode and the second forced bypass mode of operation for each dual-cell 600 in a given arm to charge half of the cell capacitors 620 at any given time, until each cell capacitor 620 is charged to $2*V_{peak}\div N$ (e.g., where K=N/2, $V_{peak}\div(N-K)=2*V_{peak}\div N$). After reaching $2*V_{peak}\div N$, the controller 900 can then cycle between placing pairs of dual-cells 600 through the third forced bypass mode and the first and second forced bypass modes to bypass three out of four cell capacitors 620 to charge one cell capacitor 620 of the four at a time to $4*V_{peak} \div N$ (e.g., where K=N*3/4, $V_{peak} \div (N-K) = 4*V_{peak} \div N$). The controller 900 may thus cycle through bypassing greater percentages of the cell capacitors 620 to double the voltage applied across the cell capacitors 620 in each arm until a charge threshold is reached. Stated differently, when the controller 900 is ready to boost the cell voltage $V_{cell}$, the halving driving schema employs exponential increases (by a power of two) in the number of cell capacitors 620 bypassed at a given time relative to a preceding time (e.g., $K_2=2*K_1=4*K_0$) to thereby increase the cell voltage $V_{cell}$ applied across the non-bypassed cell capacitors 620.

As will be appreciated, other driving schema and variations of the above schema are also contemplated, such as, for example, by identifying the cell capacitors 620 with the lowest charges to balance the charges in a given arm, such as by a Sorting and Selecting (SoS) algorithm used during normal (i.e., inverting/rectifying) operation of the MMC. The controller 900 may thus be configured for pre-charging the cell capacitors 620 to account for inherent differences in the circuitry of the dual-cells 600 in a series of iterations where each successive iteration includes a smaller subset of cell capacitors 620 charged at a given time to a correspondingly higher cell voltage $V_{cell}$.

In some embodiments, the controller 900 drives the switches in the MSC 410 while leaving the switches in the LSC 420 un-driven until $V_{cell-MSC} = V_{cell-LSC}$; equalizing the charge in the MSC 410 and the LSC 420 before boosting all of the cell capacitors 620 beyond $V_{peak} \div N$. In some embodiments, the controller 900 drives each of the arms equally, until the LSC arms reach the charge threshold, and then continues to drive the MSC arms until $V_{cell-LSC} = V_{cell-MSC}$.

Method 800 may remain at block 840 until a measured voltage satisfies a charge threshold. In some embodiments, the charge threshold is reached when K=(N−1) and the voltage $V_{cell}$ in each cell capacitor 620 has been charged to $V_{peak}/N$ (or y % of $V_{peak}/N$ to account for manufacturing tolerances in the cell capacitors 620, voltage drops across the diodes 640, and resistive losses). In other embodiments, where an operator may be more tolerant of inrush currents, the charge threshold may be reached before K=(N−1), and where nominal/rated/operating $V_{cell}$ is a predefined value less than $V_{peak}/N$ (or y % of $V_{peak}/N$). Once the measured voltage of $V_{cell}$ satisfies the charge threshold (nominal/rated/operating $V_{cell}$), method 800 proceeds to block 850.

At block 850, pre-charging is complete, and the controller 900 closes the first set of switches 361e in the transmission circuit breaker, closes the generator circuit breaker 360d, and begins switching the converter system 310 to rectify and invert the power produced by the generator 320 for supply to the power grid 330 rather than to boost the charge levels in the cell capacitors 620. To avoid causing (or reduce the amplitude of) transient currents in the harmonic filter 350, the first set of switches 361f in the pre-charging contactor 360f remain closed until after the first set of switches 361e in the transmission circuit breaker 360e are closed. The difference in resistance on the two paths over the transmission lines (i.e., through the transmission circuit breaker 360e and through the pre-charging contactor 360f) cause the current to bypass the pre-charge resistors 390 while maintaining the synchronization to the grid 330 in the harmonic filter 350 established during the pre-charging of the dual-cells 600 from the grid 330.

Method 800 may then conclude as the PCTS 300 enters normal operations, where the generator 320 provides power to the grid 330 via the converter system 310, which rectifies and inverts the power for consumption by the grid 330. The controller 900 may continue to control the switches 630 in the cells to affect rectification and inversion, and continue to control the circuit breakers 360; optionally opening the pre-charging contactor 360f after normal operations have begun.

Figure 9:
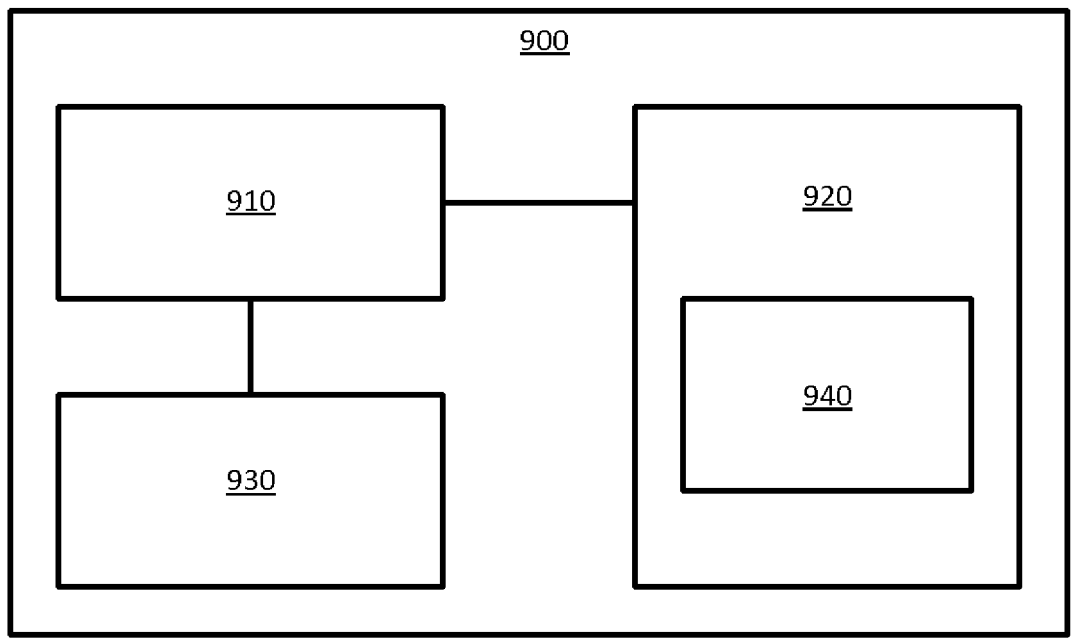
FIG. 9 is a block diagram of a controller unit as may be used as a controller, according to one or more embodiments of the present disclosure.

FIG. 9 is a block diagram of a controller unit 900, according to one or more embodiments. The controller unit 900 includes one or more computer processors 910 and a memory 920 (e.g., a memory storage device). The one or more processors 910 represent any number of processing elements that each can include any number of processing cores. The memory 920 can include volatile memory elements (such as random access memory), non-volatile memory elements (such as solid-state, magnetic, optical, or Flash-based storage), and combinations thereof. Moreover, the memory 920 can be distributed across different mediums (e.g., network storage or external hard drives).

As shown, the one or more processors 910 are communicatively coupled with a communication system 930 to send/receive communication via fiber optic cables, electrical wires, and/or radio signals with various sensors 371, circuit breakers/contactors 360, switches 630 and other controller units 900 associated with the WTG 100, APS 370, and auxiliary transformer 380, etc.

The memory 920 may include a plurality of "modules" for performing various functions described herein. In one embodiment, each module includes program code that is executable by one or more of the processors 910. However, other embodiments may include modules that are partially or fully implemented in hardware (i.e., circuitry) or firmware. The memory 920 includes a pre-charging control logic 940 that enables the controller unit 900 to charge the cell capacitors 620 while synchronizing the harmonic filter 350 to the grid 330 as described herein. In some embodiments, the pre-charging control logic 940 is preloaded with setpoints and thresholds for various control schemes, such as are described in relation to FIG. 8 by way of example.

In the preceding, reference is made to embodiments presented in this disclosure. However, the scope of the present disclosure is not limited to specific described embodiments. Instead, any combination of the features and elements provided above, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages described herein are merely illustrative and are not considered elements or limitations of the appended claims except where explicitly recited in a claim(s).

As will be appreciated by one skilled in the art, the embodiments disclosed herein may be embodied as a system, method or computer program product. Accordingly, aspects may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects may take the form of a computer program product embodied in one or more computer readable medium(s) having computer readable program code embodied thereon.

The present invention may be a system, a method, and/or a computer program product. The computer program product may include a computer-readable storage medium (or media) (e.g., a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing) having computer readable program instructions thereon for causing a processor to carry out aspects of the present invention.

Aspects of the present disclosure are described with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The flowchart and block diagrams in the Figures illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

The invention claimed is:

1. A method, comprising:
    initializing contactors to connect a power grid to a harmonic filter and a modular multilevel converter (MMC), wherein the MMC is disposed between the power grid and a generator and the harmonic filter is disposed between the power grid and the MMC, wherein initializing the contactors comprises:
        opening a transmission circuit breaker disposed on a first path, wherein the transmission circuit breaker is disposed between the power grid and the MMC, and
        closing a pre-charging contactor disposed on a second path, wherein the pre-charging contactor is disposed between the power grid and the MMC, wherein the second path is parallel to the first path and includes a set of pre-charge resistors;
    connecting the power grid to the MMC and the harmonic filter over the second path;
    pre-charging cell capacitors in the MMC from the grid over the set of pre-charge resistors during an un-driven stage;
    in response to a cell voltage of the cell capacitors satisfying a driving threshold, pre-charging the cell capacitors during a driven stage after the un-driven stage to boost a charge of the cell capacitors; and
    in response to the cell voltage satisfying a charge threshold, completing pre-charging by connecting the generator to the MMC via a generator circuit breaker while the transmission circuit breaker and the pre-charging contactor are closed,
    wherein the driving threshold is based on a peak phase-to-phase voltage of a grid voltage divided by a number of cell capacitors disposed on a given phase of the MMC.

2. The method of claim 1, wherein the driven stage employs a progressive driving schema to iteratively increase a number of cell capacitors bypassed at a given time by one relative to a preceding time to boost a charge level in non-bypassed cell capacitors.

3. The method of claim 1, wherein the driven stage employs a halving driving schema to exponentially increase a number of cell capacitors bypassed at a given time relative to a preceding time by a power of two to boost a charge level in non-bypassed cell capacitors.

4. The method of claim 1, further comprising:
    after connecting the generator, opening the pre-charging contactor.

5. The method of claim 1, wherein a resistance of the pre-charge resistors is selected based on an impedance of the harmonic filter at a grid frequency of the power grid.

6. The method of claim 1, wherein during the driven stage, a dual-cell in an arm of the MMC operates in operational modes including:
    a natural blocking mode, for charging a first cell capacitor and a second cell capacitor in the dual-cell in the arm; and
    a forced bypass mode, for bypassing at least one of the first cell capacitor or the second cell capacitor, wherein the forced bypass mode includes at least one of:
        a first forced bypass mode, for charging the first cell capacitor and bypassing the second cell capacitor;
        a second forced bypass mode, for charging the second cell capacitor and bypassing the first cell capacitor; and
        a third forced bypass mode, for bypassing the first cell capacitor and the second cell capacitor.

7. A Power Conversion and Transmission System, comprising:
    a grid circuit breaker, disposed to selectively connect a power grid with the Power Conversion and Transmission System;
    a Modular Multilevel Converter (MMC), including a plurality of cells each including cell switches and a cell capacitor;
    a generator circuit breaker, disposed to selectively connect a generator—with a machine side converter of the MMC;
    a harmonic filter, connected to a transmission line connected to a line side converter of the MMC, wherein the transmission line defines a first path when a transmission circuit breaker is closed and a second path when a pre-charging contactor is closed, wherein the first path connects the grid circuit breaker with the harmonic filter and the line side converter, wherein the second path connects the grid circuit breaker with the harmonic filter and the line side converter over a pre-charge resistor, and wherein the first path is parallel to the second path and bypasses the pre-charge resistors; and a controller configured to pre-charge the cell capacitors and synchronize the harmonic filter with the power grid by:

in response to a cell voltage in the cell capacitors satisfying a driving threshold, driving the cell switches into forced bypass modes for bypassing at least one of the cell capacitors to boost the cell voltage to a charge threshold; and in response to the cell voltage in the cell capacitors satisfying the charge threshold, while the pre-charging contactor is closed: closing the transmission circuit breaker, and closing the generator circuit breaker, the driving threshold is based on a peak phase-to-phase voltage of a grid voltage divided by a number of cell capacitors disposed on a given phase of the MMC.

8. The system of claim 7, wherein each cell of the plurality of cells is a dual cell that includes two cell capacitors and four cell switches.

9. The system of claim 7, wherein the controller is further configured to open the pre-charging contactor after closing the generator circuit breaker.

10. The system of claim 7, wherein bypassing the at least one of the cell capacitors during the forced bypass modes applies a rectified voltage from the power grid across a subset of the cell capacitors.

11. The system of claim 7, wherein the controller is further configured to cease boosting the cell voltage in response to the cell voltage in the cell capacitors satisfying the charge threshold and to place the cells in an operational mode in anticipation of inverting and rectifying power supplied from the generator for provision to the power grid.

12. The system of claim 7, wherein a resistance of the pre-charge resistor is configured to be less than 10% of an impedance of the harmonic filter at a grid frequency of the power grid.

13. The system of claim 7, further configured for three-phase power transmission.

14. A controller unit for a Power Conversion and Transmission System, comprising:

a processor; and a memory, including pre-charging control logic that when executed by the processor, enable the controller unit to perform an operation comprising:

initializing circuit breakers to connect a power grid to a harmonic filter and to a converter system, wherein initializing the circuit breakers includes:

opening a transmission circuit breaker disposed on a first path, wherein the transmission circuit breaker is disposed between the power grid and the converter system; and closing a pre-charging contactor disposed on a second path, wherein the pre-charging contactor is disposed between the power grid and the converter system, wherein the second path includes a set of pre-charge resistors, wherein the second path is parallel to the first path which bypasses the set of pre-charge resistors;

connecting the power grid to the converter system and the harmonic filter over the second path;

selectively charging cell capacitors in the converter system over a series of iterations until a charge threshold is reached, wherein each iteration of the series of iterations charges a smaller subset of the cell capacitors at a given time than in an earlier iteration of the series of iterations, and each cell capacitor is charged to a higher cell voltage than in the earlier iteration; and closing the transmission circuit breaker and connecting a generator to the converter system via a generator circuit breaker while leaving the pre-charging contactor closed.

* * * * *